(12) United States Patent
Boehl et al.

(10) Patent No.: US 9,166,795 B2
(45) Date of Patent: Oct. 20, 2015

(54) DEVICE AND METHOD FOR FORMING A SIGNATURE

(75) Inventors: Eberhard Boehl, Reutlingen (DE); Michael Boehl, Stuttgart (DE); Paulius Duplys, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 820 days.

(21) Appl. No.: 13/379,937

(22) PCT Filed: Jun. 8, 2010

(86) PCT No.: PCT/EP2010/058000
§ 371 (c)(1),
(2), (4) Date: Mar. 19, 2012

(87) PCT Pub. No.: WO2010/149491
PCT Pub. Date: Dec. 29, 2010

(65) Prior Publication Data
US 2012/0173878 A1 Jul. 5, 2012

(30) Foreign Application Priority Data
Jun. 23, 2009 (DE) .......................... 10 2009 027 086

(51) Int. Cl.
*G06F 21/00* (2013.01)
*H04L 9/32* (2006.01)
(Continued)

(52) U.S. Cl.
CPC ................ *H04L 9/3247* (2013.01); *G09C 1/00* (2013.01); *H04L 9/003* (2013.01); *H04L 9/32* (2013.01)

(58) Field of Classification Search
CPC .......... H04L 9/003; H04L 9/32; H04L 9/3247

USPC ......................................................... 713/176
See application file for complete search history.

(56) References Cited

U.S. PATENT DOCUMENTS 4,903,266 A * 2/1990 Hack ............................. 714/719
5,345,507 A 9/1994 Herzberg et al.
(Continued)

FOREIGN PATENT DOCUMENTS

CN      1858722      11/2006
CN    100 449 986      1/2009

OTHER PUBLICATIONS

Eberhard Bohl et al : "Nonlinear compression functions using the MISR approach for security purposes in automotive applications" On-Line Testing Symposium, 2009. IOLTS 2009. 15th IEEE International, IEEE, Piscataway, NJ, USA, Jun. 24, 2009, pp. 55-60, XP031504419, ISBN: 978-1-4244-4596-7.

(Continued)

*Primary Examiner* — Carl Colin
*Assistant Examiner* — Gary Lavelle
(74) *Attorney, Agent, or Firm* — Kenyon & Kenyon LLP

(57) ABSTRACT

A device is described for forming a signature from an input signal (input). According to the present invention, a plurality of transformation elements is provided, each having a finite-state machine, to which, on the input end, in each case the input signal (input) and/or a signal (input'), that is a function of the input signal, is able to be fed, all the finite-state machines are similar and are configured in such a way, particularly able to be initialized, that each finite-state machine always respectively has a different state than do all the other finite-state machines, and the signature is formable as a function of state data of at least one finite-state machine.

28 Claims, 17 Drawing Sheets

(51) Int. Cl.
*H04L 9/00* (2006.01)
*G09C 1/00* (2006.01)

(56) References Cited

U.S. PATENT DOCUMENTS

| | | | |
|---|---|---|---|
| 5,703,948 A * | 12/1997 | Yanovsky | 380/262 |
| 6,510,518 B1 * | 1/2003 | Jaffe et al. | 713/168 |
| 6,963,976 B1 | 11/2005 | Jutla | |
| 6,993,694 B1 * | 1/2006 | Kapur et al. | 714/733 |
| 7,676,727 B2 * | 3/2010 | Harter et al. | 714/763 |
| 2001/0021253 A1 * | 9/2001 | Furuya et al. | 380/259 |
| 2002/0051537 A1 | 5/2002 | Rogaway | |
| 2002/0184582 A1 * | 12/2002 | Pouya et al. | 714/726 |
| 2004/0117702 A1 * | 6/2004 | Meany | 714/726 |
| 2004/0205095 A1 * | 10/2004 | Gressel et al. | 708/253 |
| 2007/0189524 A1 | 8/2007 | Rogaway | |
| 2007/0233628 A1 * | 10/2007 | Sherwood et al. | 706/46 |
| 2008/0059855 A1 * | 3/2008 | Whetsel | 714/727 |
| 2009/0279696 A1 | 11/2009 | Ciet et al. | |

OTHER PUBLICATIONS

Carter JL et al : "Class of Easily Implemented Hash Functions" ip.com Journal, ip.com Inc., West Henrietta, NY, US, Jul. 1, 1983, XP013036038; ISSN: 1533-0001.

* cited by examiner

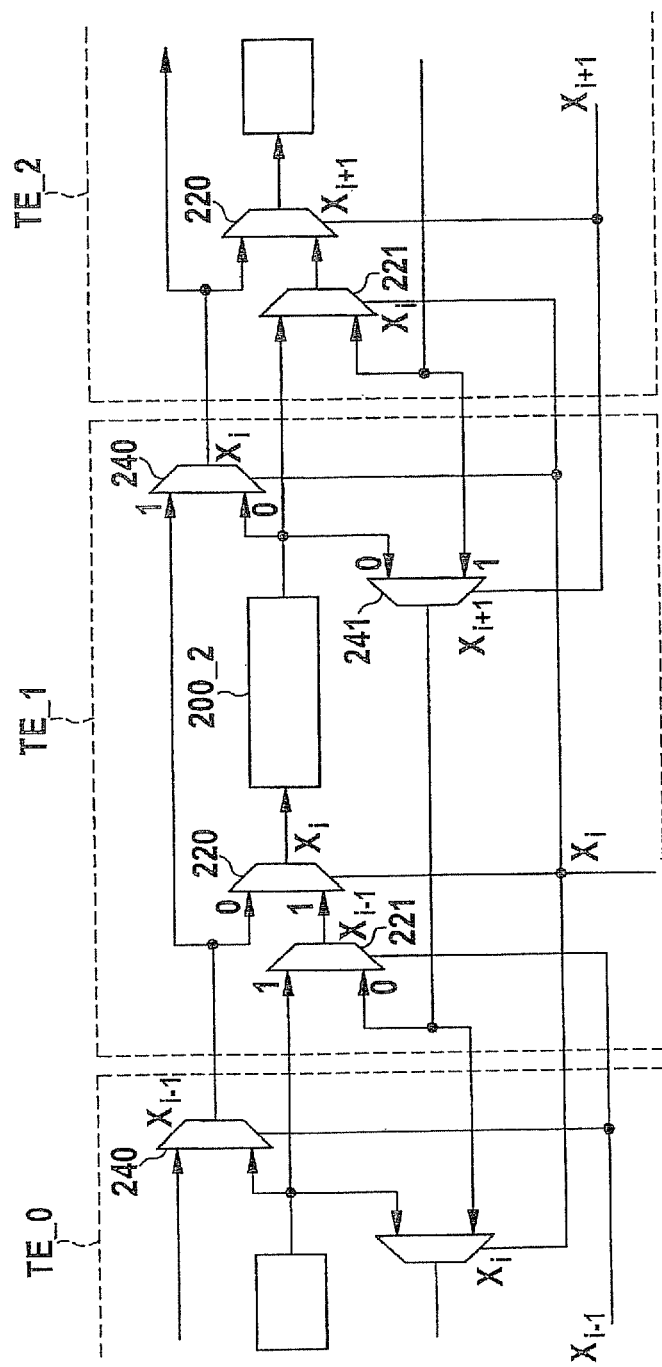

DEVICE AND METHOD FOR FORMING A SIGNATURE

SUMMARY OF THE INVENTION

The present invention relates to a device for forming a signature from an input signal. The present invention also relates to a method for forming a signature from an input signal.

BACKGROUND INFORMATION

Devices and methods of the abovementioned type are used in cryptographic methods, for example, in order to form signatures from input signals specifiable by a user. Modern cryptographic methods, according to AES, advanced encryption standard, for example, are usually protected sufficiently well against "brute force" attacks, based on comparatively great key lengths and the complexity of the method at the current state of computing technology. That is why attacks on cryptographic methods are directed, at this time, increasingly on specific implementations, which are usually implemented by certain electronic circuits. Within the scope of so-called side channel attacks, for example, an attacker tries to obtain information via the current usage of a device implementing the cryptographic method which permit drawing a conclusion on the algorithm or a secret key used by the device. Similar inferences are also possible from electromagnetic fields radiated by the device.

In one attack method also designated as differential power analysis (DPA), operand-dependent current characteristics of a subfunction of the cryptographic method is ascertained in response to as many as possible different input data, and while using a model of the attacked cryptographic algorithm, the method having different keys is submitted to a correlation analysis.

SUMMARY OF THE INVENTION

According to that, it is an object of the present invention to improve a device and a method, of the type mentioned at the outset, to the extent that, in particular, attack methods based on the differential power analysis method, for the analysis of cryptographic algorithms are made more difficult.

The object is attained, by the present invention, in a device of the type named at the outset, in that a plurality of transformation elements each having a finite-state machine is provided, to each of which, on the input side, the input signal and/or a signal that is a function of the input signal, is to be fed, in that all finite-state machines are of the same kind, and are developed in such a way, especially initializable, that each finite-state machine always has a different state in each case from all other finite-state machines, and that the signature may be formed as a function of state data of at least one finite-state machine.

According to the present invention, because of the provision of transformation elements each having a finite-state machine, it is advantageously ensured that the device according to the present invention, in contrast to usual configurations, not only causes such radiations, of electromagnetic waves or time profiles of an electric current input or power input, as exist in the usual use of a single transformation element for forming the signature. This makes an attack method based on statistical analysis more difficult, because the additional transformation elements provided according to the present invention, using their corresponding radiations or additional time profiles with respect to the current input or power input, make gathering statistically significant data with regard to the implemented algorithm more difficult.

In one specific embodiment of the device according to the present invention, it is provided particularly advantageously that the number of transformation elements corresponds to the number of the maximum possible different states of the finite-state machine. That is, the number of the transformation elements to be used is selected as a function of the implementation of the finite-state machine. It is thereby advantageously ensured that each finite-state machine of the device according to the present invention, at a certain time of observation, has a different state from all other finite-state machines, and furthermore, that all maximally possible different states, at this observation time, are actually implemented in exactly one transformation element of the device according to the present invention, respectively. This means that an analysis, taking place from outside the device according to the present invention, will always only be able to yield that all maximally possible states are implemented simultaneously, so that side channel attacks based on statistical analysis, especially also those according to the DPA principle, remain completely unsuccessful, independently of the number of attacks and the type of the input data used.

In additional specific embodiments of the device according to the present invention, the input signal is to be fed to the transformation elements in parallel, in the form of data words of specifiable length, and the signature is able to be formed as a concatenation of data words representing the state data of the finite-state machines of a plurality of transformation elements.

"Signature formation" in the present case does not mean cryptographic signature formation within the meaning of nonrepudiation, but rather quite generally a transformation of the output data corresponding in the signature to the input data represented by the input signal. Such a general signature formation is possible, in a manner known per se, using shift registers having a plurality of inputs, MISR, multiple input shift register.

In order to ensure that the theoretical maximum possible number of different states is implemented by the transformation elements according to the present invention, the respective finite-state machines are developed in such a way that a transition from an output state into a sequential state, as a function of the input signal, takes place in such a way that for any desired specifiable input signal, a unique sequential state is assumed in each case, in particular, not two different output states being in existence which lead to the same sequential state in response to the same input signal.

For the increase in flexibility in the formation of the signature, it is proposed according to a further advantageous specific embodiment of the device, according to the present invention, that several groups of transformation elements be provided, the same input signal and/or the same signal that is a function of the input signal being able to be fed to all transformation elements of the same group, respectively.

The subdivision, according to the present invention, of the transformation elements into a plurality of groups, advantageously makes possible forming an aggregate signature which is composed of portions of the output signals of the transformation elements of the first group and of portions of the output signals of the transformation elements of the second group, whereby the comprehensibility of the algorithm used for signature formation is made even more difficult.

In the use of similar finite-state machines, as well as in the transformation elements of the first group and in the transformation elements of a second group, the input signal may advantageously be supplied to the transformation elements of the first group and an inverted input signal may be supplied to the second group, to ensure that, in the different groups, in spite of the similarly developed finite-state machines, different state progressions come about in each case.

Alternatively or in addition, it may be provided that the finite-state machines of transformation elements, belonging to different groups, are not similar to one another.

In one additional and very advantageous specific embodiment of the device according to the present invention, it is provided that at least one, but all finite-state machines may each be able to be initialized using a specifiable starting state, whereby it can in particular be ensured that none of the theoretically possible states is implemented simultaneously by two different finite-state machines. In one further, special secure specific embodiment of the device according to the present invention, the starting state is able to be stored in a secret memory and is able to be transmitted to the finite-state machine(s) for the initialization. A secret memory may be implemented in that it is completely integrated into the device according to the present invention, and its presence is not detectable from the outside.

To produce a respectively individual initial state for the signature formation, it may be provided, according to an additional very advantageous variant of the present invention, that the finite-state machines, after initialization using the starting state, are first acted upon by a chance-based input signal, so that a subsequent signature formation, in which finally the desired input signal is applied to the device, always starts from another, random initial state.

In one further very advantageous specific embodiment of the device according to the present invention, in which no secret data are required for initializing the finite-state machines, it is provided that all finite-state machines are each initialized using a specifiable starting state, each finite-state machine being initialized using a different starting state. Subsequently, the individual starting states of the finite-state machines are permutated among one another, which may take place particularly as a matter of chance and/or as a function of a secret key.

In one further specific embodiment of the device according to the present invention, it is provided that the device be implemented at least partially in the form of a circuit system having, which may be monolithically integrated, electronic and/or optical components.

In order further to minimize the data given off to the environment and, with that, to potential attackers via the internal sequences of signature formation, it may be provided, according to one very advantageous invention variant, that such groups of components and/or data lines contacting them, which implement the transformation elements or their finite-state machines, are developed similarly, particularly in the form of repetitive patterns in a layout corresponding to the circuit system. Particularly, all the components or groups of components, implementing finite-state machines according to the present invention, may be situated spatially as closely as possible next to one another, in order to make more difficult the obtaining of data by a differential analysis of interference radiations.

In one additional, very advantageous specific embodiment of the device according to the present invention, it is provided that at least one finite-state machine, and, however, in a particular embodiment all finite-state machines may be implemented using a nonlinear feedback shift register, which may have a plurality of inputs. Such a shift register designated in English also as a "nonlinear multiple input shift register", NLMISR, is particularly suitable for implementing the transformation of the input signal into output data required for the signature formation. The NLMISR is also used, particularly expediently, for implementing the finite-state machines.

One particular variant of the present invention provides that the NLMISR have a plurality of storage elements that are connected in series and may be configured as flip-flops, and a switchover unit that is developed to modify at least one feedback branch of the NLMISR as a function of the input signal in such a way that, because of the NLMISR, a polynomial is able to be implemented that is assigned to the state of the input signal.

In this variant of the present invention, the state information of the finite-state machine implemented by the NLMISR is formed by the content of memory elements or flip-flops. For instance, an NLMISR may be developed to process an up to 4-bit-long input signal, and optionally to implement the primitive polynomials $x^4+x^3+1$ and $x^4+x+1$. Such an NLMISR may have altogether four flip-flops, so that the maximum possible number of different states of the finite-state machine implemented by the NLMISR is equivalent to $2^4=16$.

In another specific embodiment of the device according to the present invention, the NLMISR is developed to process an up to 3-bit long input signal and optionally to implement the primitive polynomials $x^3+x+1$ and $x^3+x^2+1$.

Based on the provision of a plurality of transformation elements, the device according to the present invention, for forming the signature, has exactly the same current usage for each state transition, so that, compared to the usual configurations, a substantially increased robustness with respect to DPA attacks comes about.

By contrast, in a so-called "dual rail" method, according to the related art, it is assumed that a low-high transition of a digital switching device is compensated for by a "high-low" transition taking place at the same time. This usual approach, however, disadvantageously requires an accurate balancing of the respective transitions. Furthermore, technological fluctuations, for instance, of the threshold voltage of a charge transistor (in CMOS: P-channel) as opposed to a discharge transistor (in CMOS: N-channel) have the effect that the balance is disturbed. This problem does not exist in response to the principle according to the present invention.

In one optimal implementation of the device according to the present invention, in which, in particular, all different groups of data lines connecting components are developed symmetrically, and accordingly only minimal run time differences come about between the various signal-processing components, the success quota of DPA attacks can not only be improved by an increase in the number of measurements, because the device according to the present invention has a current consumption and a radiation of electromagnetic waves that is completely independent of the internal states of the signal-processing components.

As an additional attainment of the object of the present invention, a method is given as described herein.

The method according to the present invention provides that, at the input end, respectively the input signal and/or a signal that is a function of the input signal is fed to a plurality of transformation elements each having a finite-state machine, that all finite-state machines are similar and may be initialized in such a way that each finite-state machine always respectively has a different state from all other finite-state machines, and that the signature is formed as a function of state data of at least one finite-state machine.

Because of the provision, according to the exemplary embodiments and/or exemplary methods of the present invention, of a plurality of the same kind of transformation elements and corresponding finite-state machines, the possibility is advantageously made more difficult of drawing conclusions from the electrical power input of the device operated according to the present invention, or also from the electromagnetic waves radiated by the device, with regard to an internal processing state.

Particularly advantageously, as many transformation elements are used as the number of possible different states exist, of the finite-state machines, so that in each processing cycle of the device according to the present invention, respectively exactly one finite-state machine has a possible state, and overall every possible state is implemented in the processing cycle by all finite-state machines. In a processing cycle subsequent to this, each finite-state machine changes its state according to a polynomial implemented by it and according to input data present at it, so that in turn, each finite-state machine of the device according to the present invention has one of the possible states. This has the result that, even in the following processing cycle, all theoretically possible states are implemented by exactly one finite-state machine of the device according to the present invention, and consequently, from one observation of the current input and/or power input or of interference radiations of the device according to the present invention, no conclusions are able to be drawn on internal processing processes within the scope of the signature formation.

Further advantageous developments of the exemplary embodiments and/or exemplary methods of the present invention are the subject matter of the further description herein.

Further advantages, features and details result from the following description, in which different exemplary embodiments of the present invention are shown with reference to the drawings. In this context, the features described herein and the description may be essential to the present invention either individually in isolation or in any combination.

BRIEF DESCRIPTION OF THE DRAWINGS

FIG. 9 shows a state transition graphic presentation of the nonlinear feedback shift register according to FIG. 6a.

FIGS. 10a and 10b show transformation elements according to the present invention, each having a nonlinear feedback shift register for implementing a finite-state machine.

FIGS. 11b and 11c show the linear feedback shift registers implemented by the shift register according to FIG. 11a.

FIG. 12 show a state transition graphic presentation of the nonlinear feedback shift register according to FIG. 11a.

DETAILED DESCRIPTION

Figure 1:
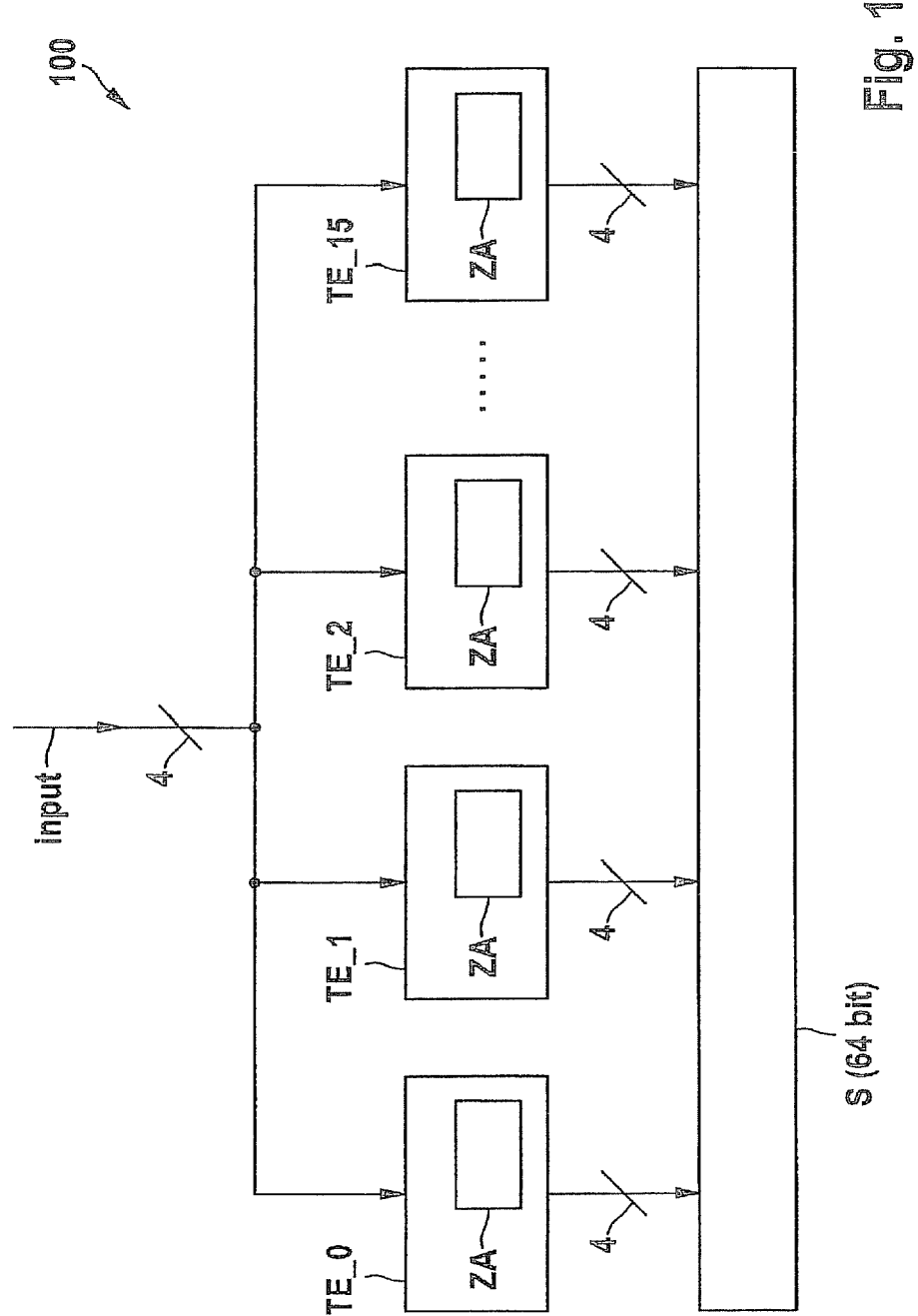
FIG. 1 shows a first specific embodiment of the device according to the present invention.

FIG. 1 shows schematically a first specific embodiment of a device 100 according to the present invention for forming a signature S from an input signal input. The input signal input is supplied to device 100 present in the form of half-bytes, that are also designated as nibbles. For this, as may be seen in FIG. 1, accordingly four data lines are provided which are connected to corresponding inputs of transformation elements TE_0, TE_1, TE_2, ..., TE_15. There is always the possibility of using fewer input lines. For the sake of clarity, only four of altogether sixteen transformation elements TE_0, ..., TE_15 are illustrated. The data connection is implemented, according to the present invention, in such a way that the same input data input or the same input signal is supplied to each transformation element TE_0, ..., TE_15.

In a manner described in more detail below, transformation elements TE_0, TE 15 form an output signal that is presently not designated more closely, from the input signal input supplied to them. According to the exemplary embodiments and/or exemplary methods of the present invention, the output signals of a plurality of transformation elements TE_0 are combined, for instance, strung together within the meaning of a concatenation, to obtain signature S.

Since, in the present example, each transformation element TE_0, TE_1 generates a four-bit long output signal, i.e. a nibble, there comes about, because of the combination of the output signals of all sixteen transformation elements, a signature S having 64 bits altogether.

Transformation elements TE_0, ..., TE_15 according to the exemplary embodiments and/or exemplary methods of the present invention each have a finite-state machine ZA, whose state data are stored, for example, in the form of a digital data word of specifiable length. Finite-state machine ZA may have a storage capacity of four bits, for example, so that altogether 16 different states are possible.

According to the exemplary embodiments and/or exemplary methods of the present invention, all finite-state machines ZA of transformation elements TE_0, ..., TE_15 are developed similarly. Similar within the meaning of the exemplary embodiments and/or exemplary methods of the present invention means that each finite-state machine ZA, starting from identical input signals input and an identical initialization state, will assume the same sequential state in a subsequent processing cycle as another similar finite-state machine ZA.

It is further provided, according to the exemplary embodiments and/or exemplary methods of the present invention, that each finite-state machine ZA always has a different state from all other finite-state machines ZA of signature device 100. Because of this, DPA attacks, which try from an analysis of an electric current input and/or power input or from interference radiations of device 100, according to the exemplary embodiments and/or exemplary methods of the present invention, to draw conclusions on an internal processing state of device 100 or on individual transformation elements TE_0, ..., TE_15, are advantageously made more difficult.

Quite especially advantageously, the number of transformation elements TE_0, . . . , TE_15, provided according to the exemplary embodiments and/or exemplary methods of the present invention, corresponds to the number of maximum possible different states of finite-state machine ZA, that is, sixteen, at present. That is why in device 100 according to the present invention, there is always present, that is, in each processing cycle, each theoretically possible state in exactly one of finite-state machines ZA, so that towards the outside, that is, a possible attacker, that is carrying out a DPA attack, in each case only one combination of all sixteen possible states is "visible".

In a following processing cycle too, in which, to be sure, individual finite-state machines ZA each change their sate according to a specified rule, once again, overall in each of the 16 finite-state machines ZA, exactly one of the sixteen possible states is present, so that, towards the outside, again all 16 states are simultaneously "visible".

This means that a possible attacker is not able to use an appropriate electromagnetic radiation, which is a given in response to a usual implementation of device 100 according to the present invention with the aid of electronic components, or also is not able to use an electric power input of device 100, to draw a conclusion on the state of the internal signal processing in transformation elements TE_0, . . . , TE_15, because, in the case of an ideal symmetrical layout of all components, the electrical power input is always constant, and the radiated electromagnetic field in each case does not experience any significant changes when there is a change of state between successive processing cycles.

Besides the input signal input, changing, for instance, synchronously with a clock signal that defines successive processing cycles, in a manner known per se, there is also acting simultaneously the respective current state of respective finite-state machine ZA to form a sequential state. Examples of this are stated further down, with reference to FIGS. 6a, 6b. This means that, after each processing cycle, at an output of a transformation element TE_0, . . . , output data are present having four bits which have been formed as a function of input data input and the state data of respective finite-state machine ZA.

A linking of the output signals of all finite-state machines ZA or rather transformation elements TE_0, . . . , TE_15 including them, which may be carried out, for instance, within the meaning of a concatenation, finally yields a signature S having 64 bits.

In the next processing cycle of signature device 100 according to the present invention, the output signals of the participating transformation elements TE_0, . . . , TE_15 change again correspondingly, so that there is then also present a different signature S.

Although the provision of such a number of transformation elements is particularly expedient, which corresponds to the maximum possible number of different states of finite-state machines ZA, it is also possible, according to the exemplary embodiments and/or exemplary methods of the present invention, to provide device 100 according to the present invention with a lower number of transformation elements, such as, for instance, with altogether only three transformation elements. In this case too, a DPA attack is already advantageously made more difficult, because the different signals and power inputs of the altogether three transformation elements overlap, and consequently, the significance of the signal, that is detectable because of an attacker, with regard to the signal processing in signature device 100, becomes decreased.

If signatures S are desired to have a different length than 64 bits, one may also use in each case, for example, only a subset of the output signals of transformation elements TE_0, . . . , TE_15.

Figure 2:
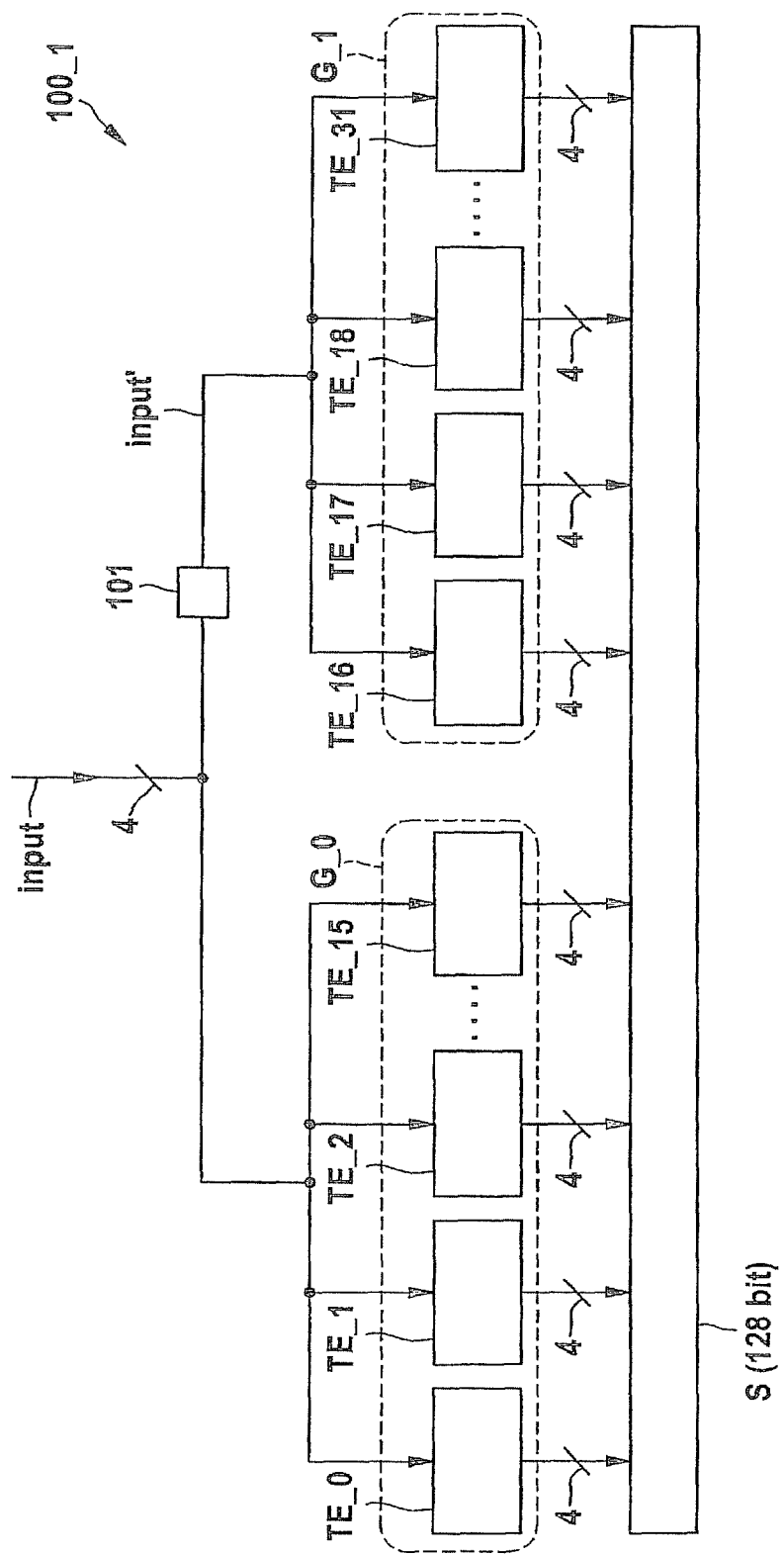
FIGS. 2, 3, and 4 show, respectively, additional specific embodiments of the device according to the present invention, having a plurality of groups of transformation elements.

FIG. 2 shows a further specific embodiment 100_1 of the signature device according to the present invention, in which two groups G_0, G_1 of transformation elements are provided.

Each group G_0, G_1 has altogether 16 different transformation elements TE_0, . . . , TE_15 and TE_16, . . . , TE_31, which are all developed to be similar and which have similarly developed finite-state machines. For the sake of clarity, the finite-state machines are not illustrated in FIG. 2.

First group G_0 of transformation elements according to FIG. 2 implements a signature formation, according to the exemplary embodiments and/or exemplary methods of the present invention, comparable to the principle explained above with reference to FIG. 1.

Second group G_1 of transformation elements works in a comparable manner, but as input signal does not receive the regular input signal input which is supplied to transformation elements TE_0, . . . , TE_15 of first group G_0. Rather, transformation elements TE_17, . . . , TE_31, that appertain to second group G_1, receive as input signal an inverted input signal input', which is obtained by inverter 101 from the regular input signal input. Each bit of the nibbles forming the input signal input, for example, may be inverted by itself by inverter 101, to form the inverted nibble input'.

Because of the invention variant illustrated in FIG. 2, complementary or inverse input signals input, input' of groups G_0, G_1 are advantageously processed so that changes of input signal input are compensated accordingly. This compensation is especially of advantage if input signal input itself is not known, and is also to be kept secret from a possible attacker. In total, signature device 100_1 according to FIG. 2 yields a maximum signature length of 128 bits.

Figure 3:
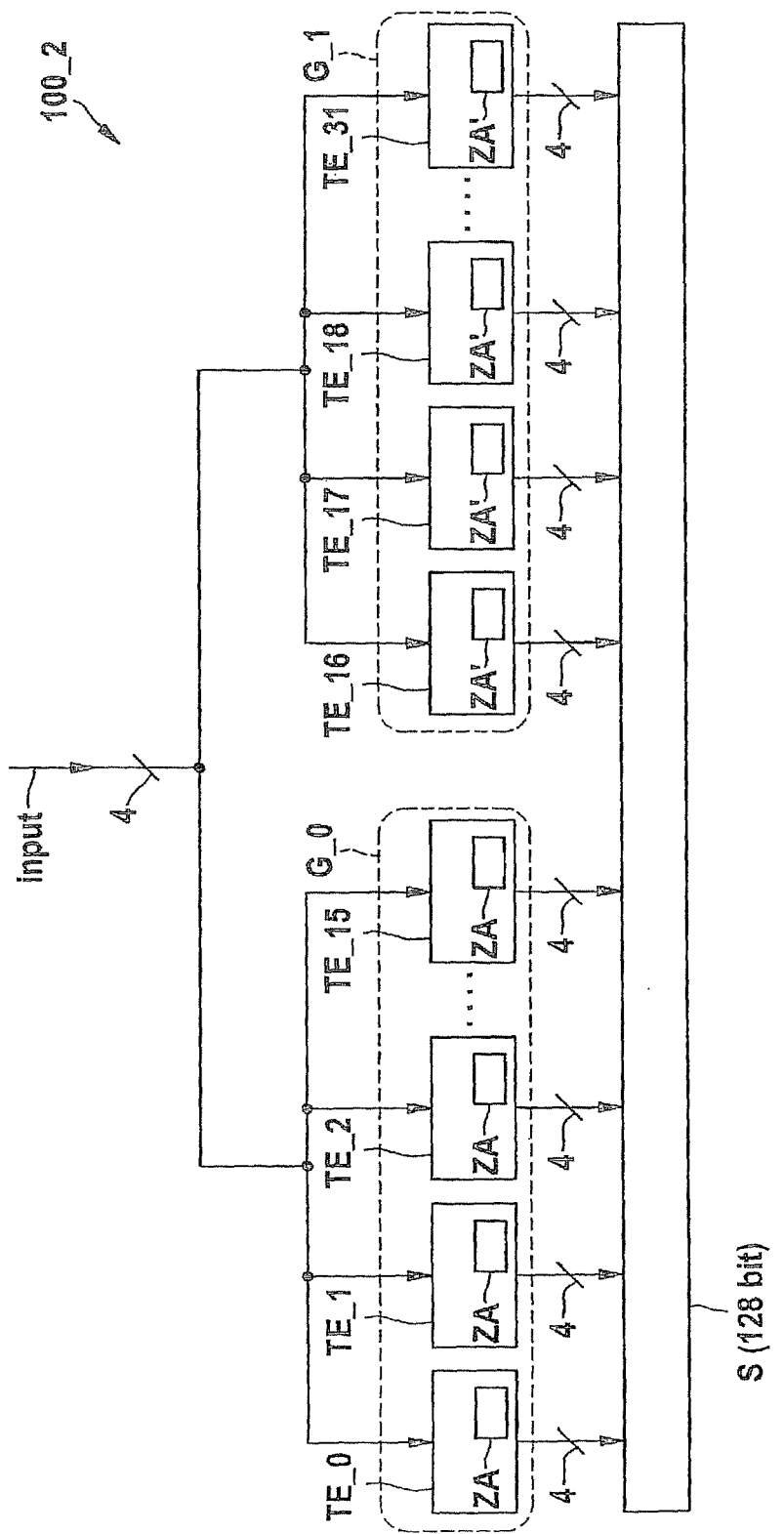

FIG. 3 shows a further specific embodiment 100_2 of the signature device according to the present invention, in which two groups G_0, G_1 of transformation elements are again provided.

By contrast to the invention variant described above with reference to FIG. 2, the same input signal input is supplied to both groups G_0, G_1 illustrated in FIG. 3. The generation of different output signals by transformation elements TE_16, . . . , TE_31 of second group G_1 is presently assured in that finite-state machines ZA' of the transformation elements belonging to second group G_1 are developed differently from finite-state machines ZA of the transformation elements of first group G_0. Because of the combination of all output signals of the participating transformation elements, a signature having a length of 128 bits again advantageously comes about.

Figure 4:
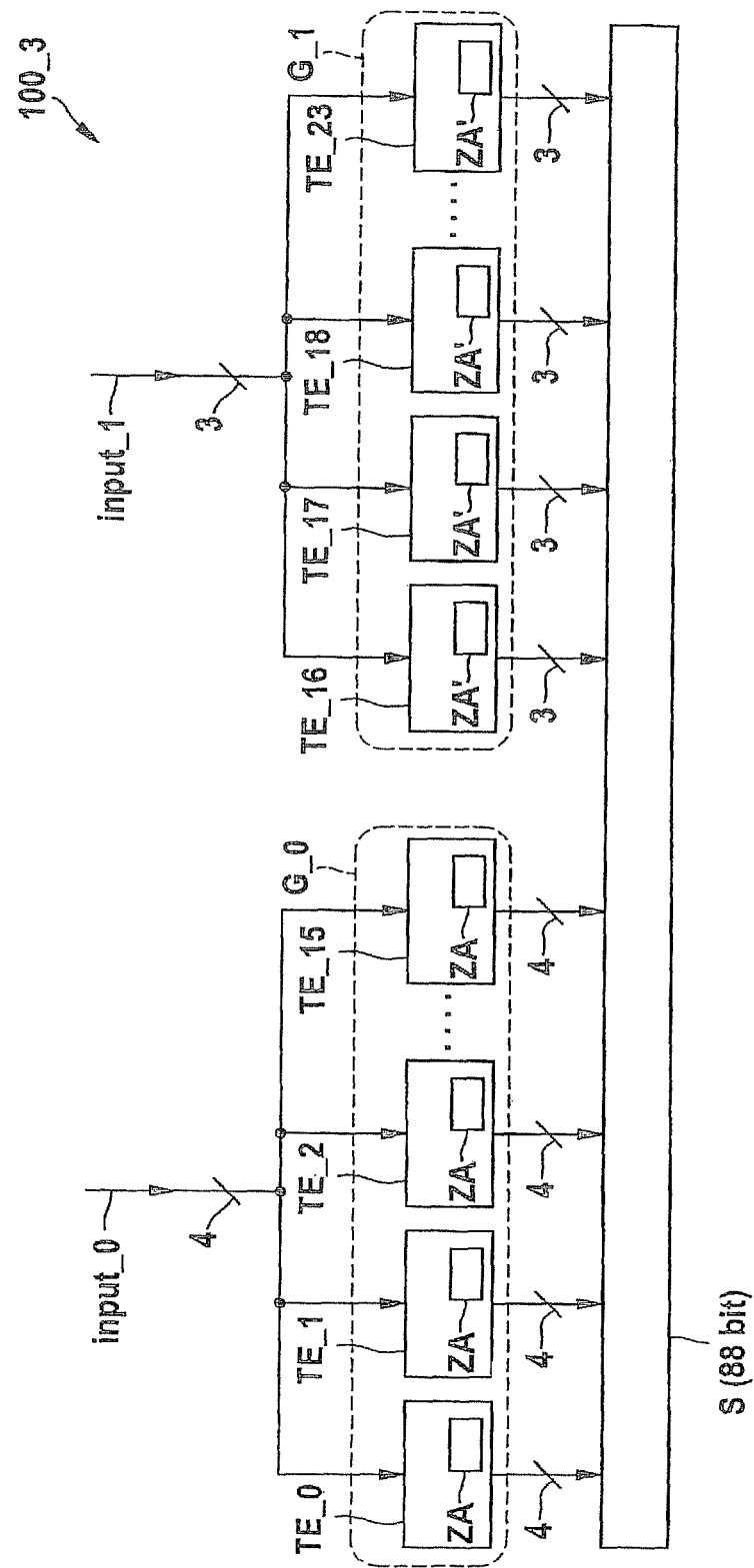

FIG. 4 shows an additional specific embodiment 100_3 of the signature device according to the present invention. In this specific embodiment, to second group G_1 of transformation elements, which presently has only eight instead of the 16 transformation elements up to now, input signals input_1 in the form of data words having 3 bits are supplied. Finite-state machines ZA' produce output signals having a word length also of 3 bits. In total, a signature having a maximum length of 88 bits is able to be obtained from the output signals of the participating transformation elements TE_0, . . . , TE_23.

Finite-state machines ZA' of second group G_1 of transformation elements, by contrast to the illustration of FIG. 4, may also similarly be developed to form finite-state machines ZA of first group G_0, but will still supply different output signals, because a second input signal input_1 is supplied to them, which differs from first input signal input_0 for first group G_0. Since, however, at present finite-state machines ZA of first group G_0 include four memory elements and finite-state machines ZA' of second group G_1 only three memory elements, not all possible initial states are then implemented in group G_1, which may be changed by the addition of up to eight additional transformation elements to second group G_1.

An initialization process of signature device 100, according to the present invention, is described below, with reference to FIGS. 5a, 5b and 5c. In this instance, we shall assume a basic structure of signature device 100 according to FIG. 1.

Figure 5A:
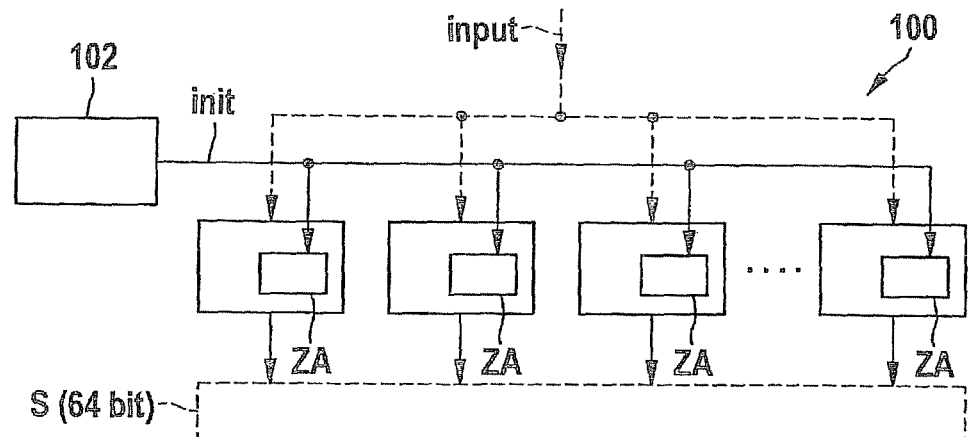
FIGS. 5a, 5b, and 5c show in each case different operating states of the device according to the present invention as in FIG. 1, during an initialization process.

For the initialization of signature device 100, in a first step, compare FIG. 5a, all finite-state machines ZA of the transformation elements, that are at present not designated in greater detail, are initialized using a specifiable starting state init. Especially, in this instance, each finite-state machine ZA may be initialized with another individual starting state from the remaining finite-state machines ZA, which means that each of the altogether 16 finite-state machines ZA of signature device 100 according to FIG. 5a is initialized using a unique starting state.

This individual starting state is called up presently from a secret memory 102, and during the initialization it is transmitted to the state memory of finite-state machines ZA.

During the step of initialization described above, the state of input signal input is not decisive, and therefore the corresponding signal flows are characterized by dashed lines. Also, at this time, a meaningful signature value S is not yet present at the outputs of the transformation elements.

Figure 5B:
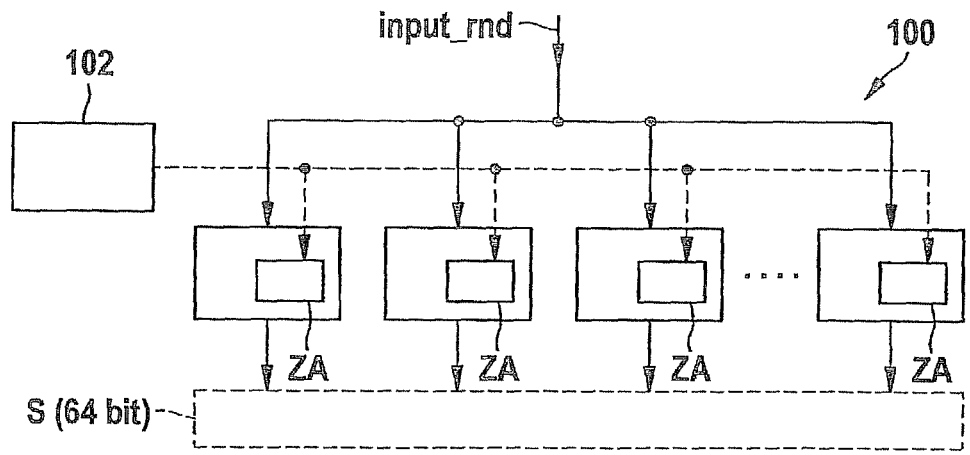

In a second step, compare FIG. 5b, each finite-state machine ZA has applied to it a chance-based input signal input_md. It is advantageously assured thereby that each finite-state machine ZA is in a different output state, for the subsequent signature formation, than the one it was present in during a previous signature formation or directly after the initialization.

This means that, although secret memory 102 contains a starting state that is constant over the lifetime of signature device 100 for the individual initialization of the finite-state machines, a new, chance-determined output state is able to be reached for each operating cycle of signature device 100 while using chance-determined input signals input_md, starting from the stored starting states init (FIG. 5a).

The action upon finite-state machines ZA by chance-based input signal input_md is able to take place for one or more processing cycles. During these processing cycles, there is also not yet present a valid signature S that is assigned to specific input data.

Figure 5C:
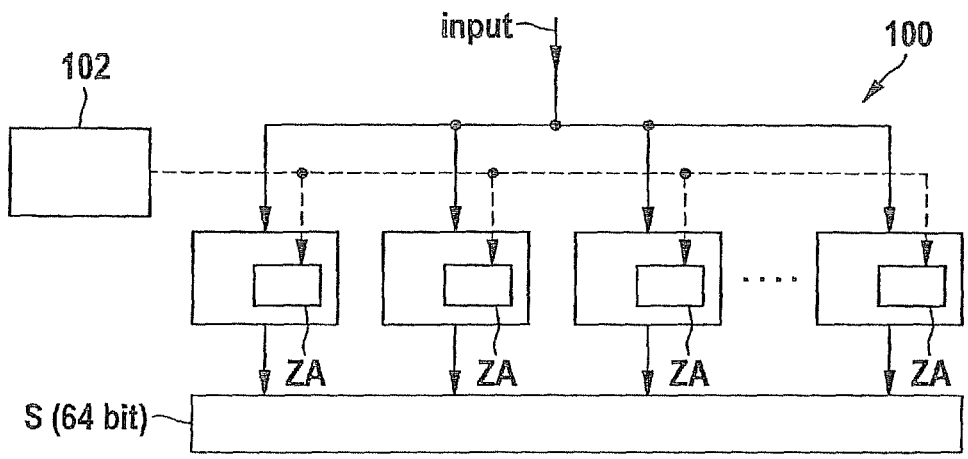

Only at the operating state shown in FIG. 5c, at which signature device 100 is acted upon by a regular input signal input is there a signature S present generated by finite-state machines ZA at the outputs of the transformation elements.

Figure 6A:
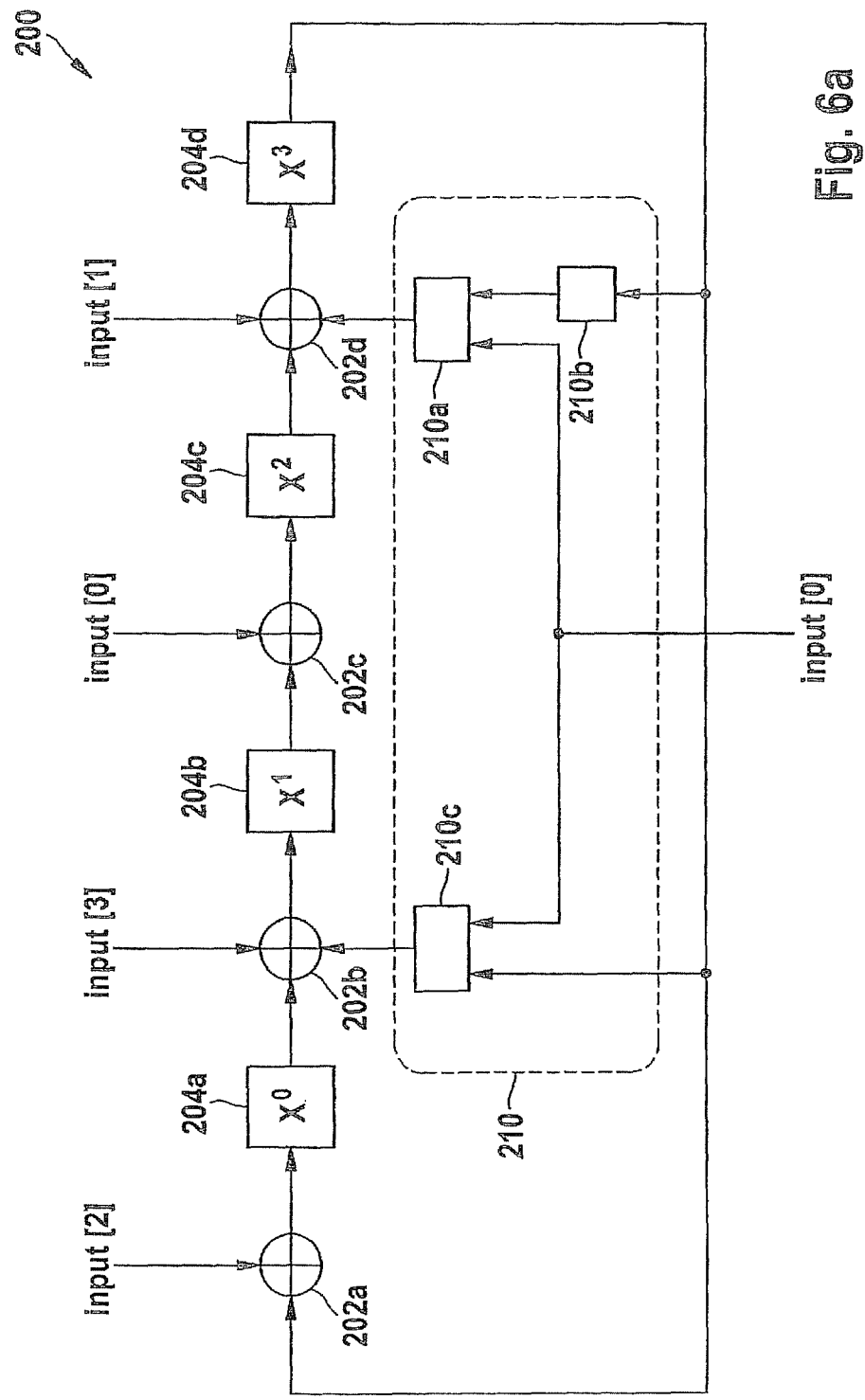
FIG. 6a shows an implementation of a finite-state machine in the form of a nonlinear, feedback shift register.

FIG. 6a shows a simplified circuit system of a nonlinear feedback shift register 200, which has several inputs, input [0], input[1], input[2], input[3], by which different bits of input signal input are able to be connected. As may be seen in FIG. 6a, shift register 200, that is briefly also designated as NLMISR, nonlinear multiple input shift register, has a plurality of memory elements 204a, 204b, 204c, 204d that are connected in series and may be configured as flip-flops. Memory elements 204a, 204b, 204c, 204d are linked among themselves, in a manner known per se, by nonequivalence elements 202a, 202b, 202c, 202d, which carry out a modulo 2 addition of the input variables supplied to them.

Nonlinear feedback shift register 200 has a switchover unit 210, which advantageously implements a variable feedback path. As a function of input signal input[0] and of state or output signal of memory element 204d, switchover unit 210 modifies a feedback mechanism of shift register 200 in such a way that optionally a first primitive polynomial or even a second primitive polynomial is implemented by shift register 200. Into switchover unit 210, the other input signals input[1], . . . , input[3] are also able to flow.

In a particular manner, nonlinear feedback shift register 200 may be presently configured to process an overall 4-bit length input signal input (FIG. 1), whose bit components correspond to the inputs input[0], input[1], input[2], input[3].

In the configuration, illustrated in FIG. 6a, of switchover unit 210, the output signal of memory element 204d and input signal input[0] act upon an AND element 210c, whose output signal in turn acts upon a nonequivalence element 202b. Furthermore, input signal input[0] and an inverted output signal of memory element 204d act upon a functional block 210a, which implements an OR operation. As may be seen in FIG. 6a, the output signal of functional block 210a is supplied to nonequivalence element 202d.

The inverted output signal of memory element 204d is presently obtained by inverter 210b.

Based on the circuit configurations of switchover unit 210, described above, nonlinear feedback shift register 200, as a function of input signal input[0] optionally implements the primitive polynomials $x^4+x^3+1$ and $x^4+x+1$. Thereby come about advantageously the states schematically illustrated in FIG. 9 and the state transitions for a finite-state machine implemented using shift register 200.

Figure 9:
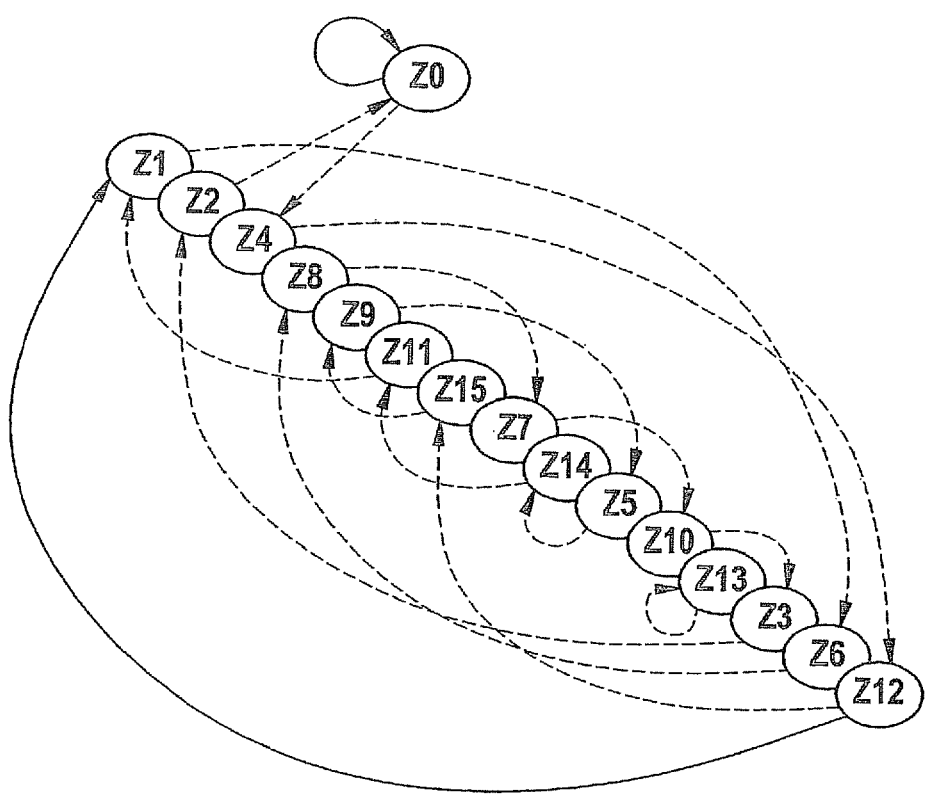

The total of sixteen different possible states Z0, Z1, . . . , Z15 are symbolized in FIG. 9 by correspondingly designated ellipses. The ordinal number of a state corresponds, in this case, to a decimal representation of the nibbles represented by memories 204a, . . . , 204d of shift register 200, when the least significant bit, LSB, is stored in memory element 204a and the most significant bit, MSB, is stored in memory element 204d.

State transitions among the various states are symbolized using broken line arrows and using solid line arrows. Broken line arrows indicate a state transition, in this context, which comes about as a result of an input signal value of one, of input signal input[0], while solid line arrows indicate the kind of state transitions which come about as a result of an input signal value of zero. For the state transitions shown in FIG. 9, it is assumed that the input signals input[1]=input[2]=input [3]=0.

Furthermore, in FIG. 9, a state transition from an initial state to a sequential state based on an input signal value of zero, instead of by a solid line arrow, is also characterized in that the ellipses representing the initial state and the sequential state overlap partially, a sequential state in FIG. 9 in each case lying directly to the right below the initial state assigned to it. For example, the finite-state machine, implemented by the nonlinear feedback shift register 200 according to FIG. 6a, changes from an initial state Z1 to sequential state Z2 when input signal input[0] has a value of zero. By contrast, the finite-state machine changes from initial state Z1 into additional sequential state Z6 when input signal input[0] has a value of one, compare the broken line arrow that starts from initial state Z1, and points to sequential state Z6.

Because of the configuration of nonlinear feedback shift register 200 according to FIG. 6a, it is advantageously ensured that a transition into a sequential state as a function of the input signals takes place in exactly such a manner that for any particular fixed assignment of the input signal a clear sequential state is assumed, and that there are not two different states which lead to the same sequential state in response to the same assignment of the input signal. Each of the possible states illustrated in FIG. 9 of the finite-state machines implemented by shift register 200 according to FIG. 6a, at a constant input signal, thus has exactly one follow-up state and exactly one predecessor state for one constant input signal, respectively.

Because of this, and in combination with the initialization described above with reference to FIGS. 5a, 5b, 5c, it is advantageously ensured that each finite-state machine ZA of signature device 100 (FIG. 1) in each processing cycle has one state that is different from the state of all other finite-state machines ZA in the same processing cycle.

Figure 6B:
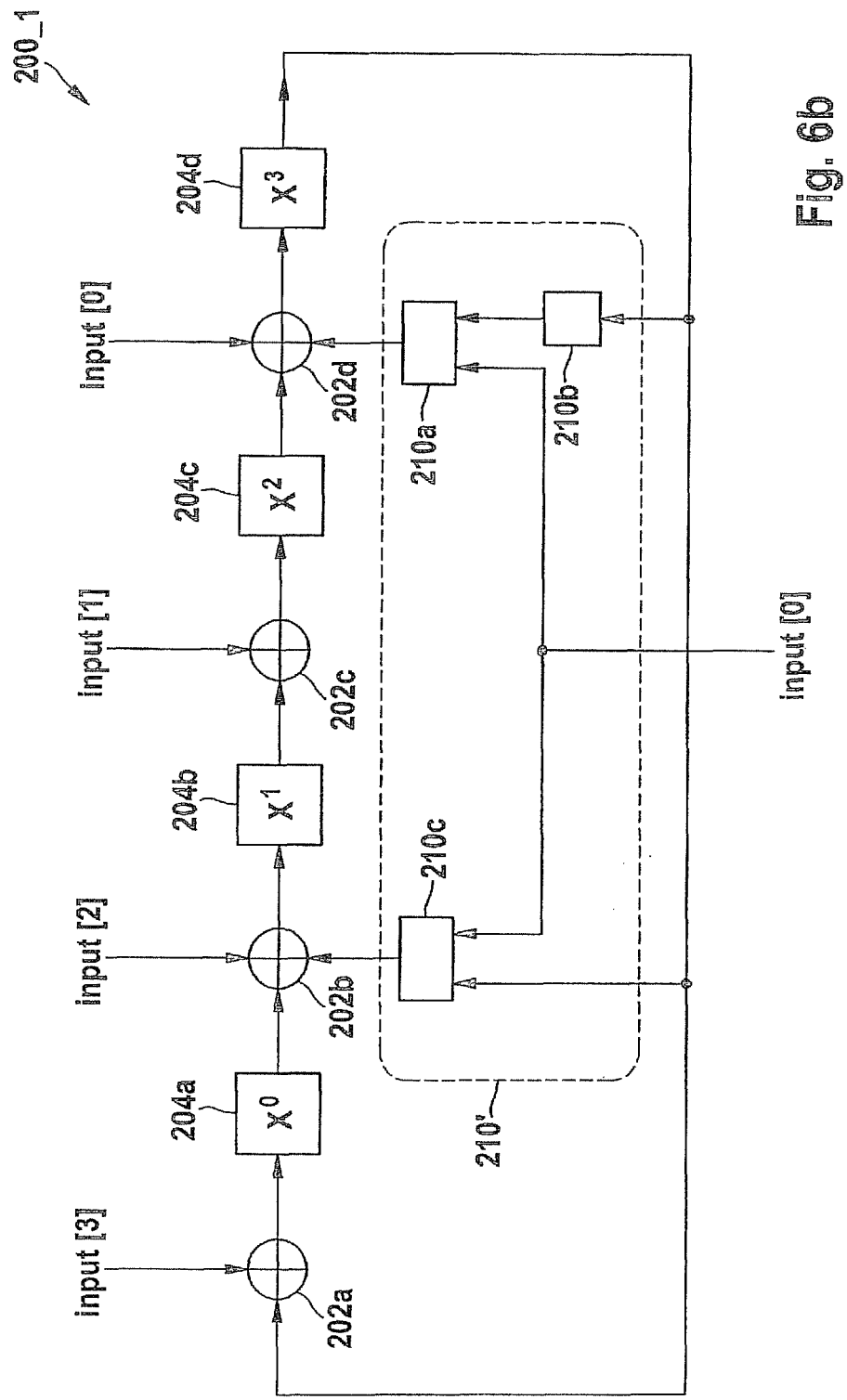
FIG. 6b shows an additional implementation of a finite-state machine according to the present invention in the form of a nonlinear, feedback shift register.

FIG. 6b shows an additional specific embodiment of a nonlinear feedback shift register 200_1 which is particularly suitable for carrying out the method according to the present invention.

Input signals input[0], input[1], input[2], input[3] are supplied to shift register 200_1 illustrated in FIG. 6b, in deviation from the manner described with reference to FIG. 6a.

The nonlinear feedback shift register 200 illustrated in FIG. 6a may, for instance, be used to implement a first group G_0 of transformation elements having a finite-state machine developed in the first manner, while the nonlinear feedback shift register 200_1 according to FIG. 6b is suitable, for instance, for developing a finite-state machine ZA' for the second group G_1 of transformation elements according to FIG. 3.

Figure 7:
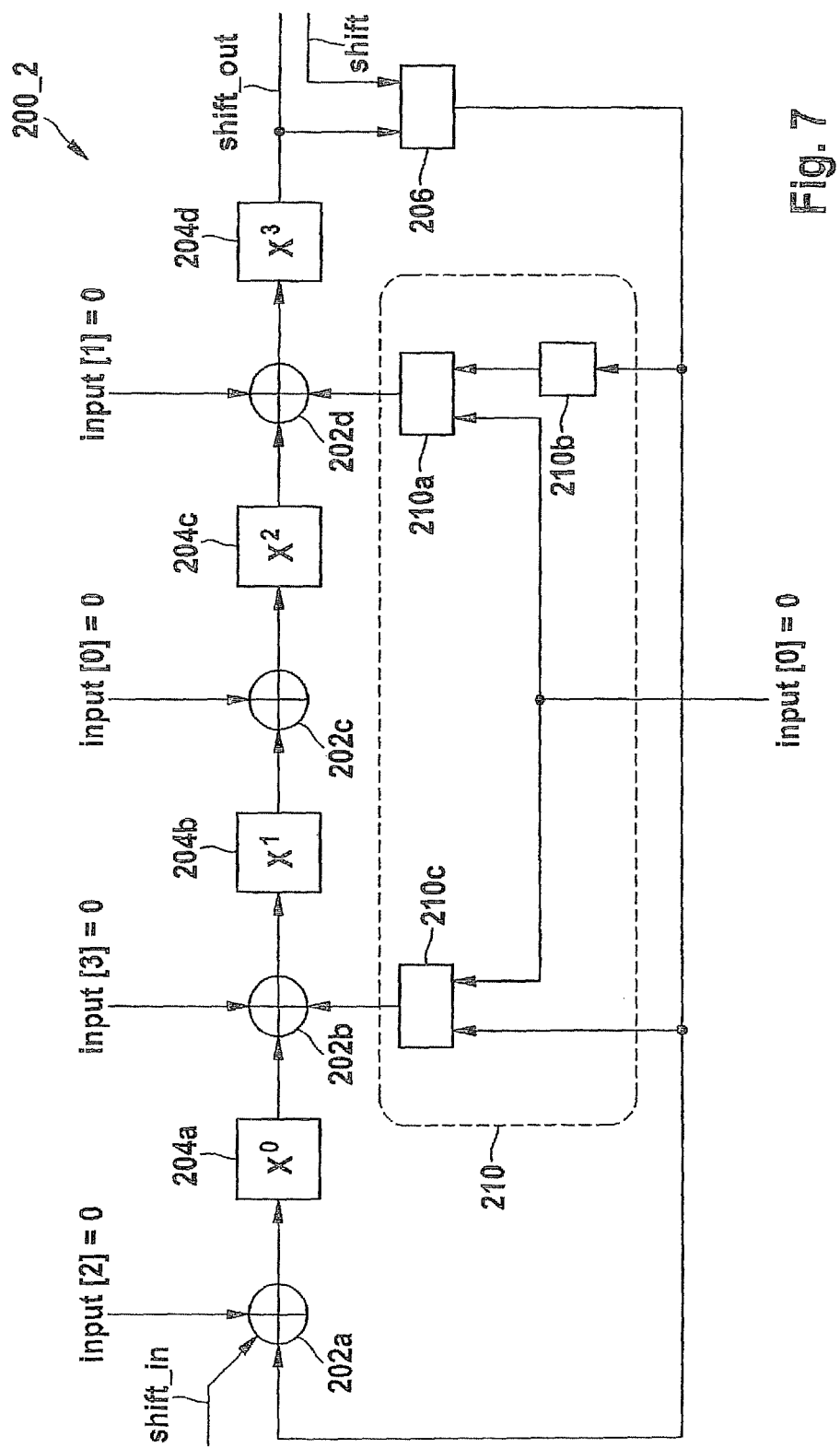
FIG. 7 shows a modified nonlinear feedback shift register for the simple setting of an initialization state.

FIG. 7 shows a nonlinear feedback shift register 200_2 having a circuit topology that is modified compared to FIGS. 6a, 6b. Nonlinear feedback shift register 200_2 illustrated in FIG. 7 has, in addition, a functional block 206 which implements a NOR operation between output signal out of memory element 204d and a control signal shift.

It is thereby possible, as a function of a logical state of control signal shift, to activate or deactivate the feedback for nonlinear feedback shift register 200_2 according to FIG. 7.

This is particularly of advantage if, within the scope of the initialization of signature device 100, or its finite-state machines ZA, no starting state is to be used that is stored in a secret memory 102 (FIG. 5a). Rather, by an appropriate selection of the state of control signal shift and a special interconnection configuration of the plurality of finite-state machines ZA of the signature device 100, according to the present invention, that is described in more detail below with reference to FIG. 10a, a permutation of state values among the finite-state machines is able to take place, within the meaning of a circulating memory, so that no secret memory 102 has to be provided, which has a positive effect on the production costs.

Figure 10A:
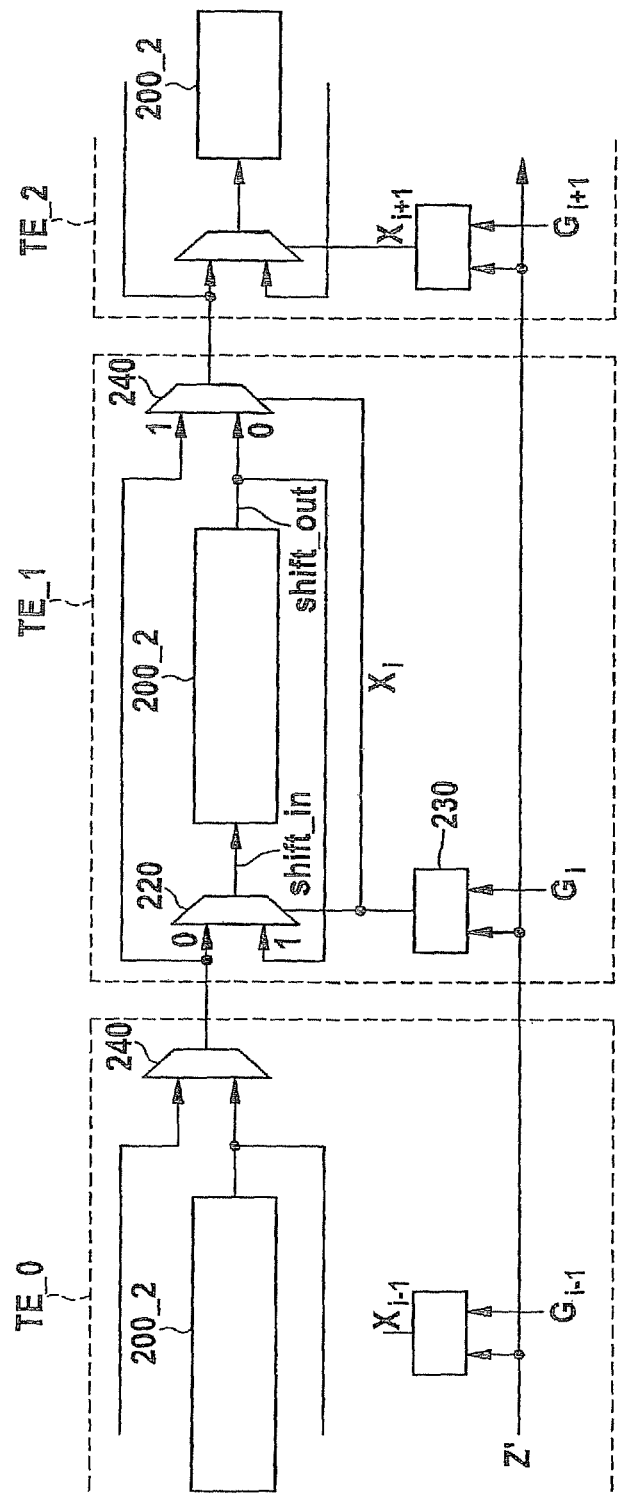

FIG. 10a shows on this topic a circuit system for a transformation element TE_1, which has a finite-state machine developed as a nonlinear feedback shift register 200_2, according to FIG. 7. Besides shift register 200_2, transformation element TE_1 has an input multiplexer 220, a functional block 230 and an output multiplexer 240. The configuration of transformation element TE_1 illustrated permits connecting transformation element TE_1, together with the similarly developed additional transformation elements TE_0, TE_2, . . . to form a ring-shaped shift register, input multiplexer 220 of each transformation element being located between shift register 200_2 of the observed transformation element TE_1 and output multiplexer 240 of a transformation element TE_0 preceding in the ring structure.

While using control signal shift described previously with reference to FIG. 7, the feedback mechanisms for all transformation elements are deactivated, so that, per processing cycle, the bits stored in the ring-shaped shift register are each shifted, but are not modified, for instance, within the meaning of signature formation. Bit $X_i$ controlling multiplexers 220, 240 of the $i^{th}$ stage of ring-shaped shift register TE_0, TE_1, . . . , should be a function both of a chance-dependent bit Z' and of at least one bit $G_i$ of a secret key, in this context, as may be seen in FIG. 10a. All $X_i$ values are applied simultaneously and kept constant in each case for four processing cycles. Bit $X_i$ decides in each case whether the respective nonlinear feedback shift register 200_2 is a component of the big shift register ring or whether it is skipped. Depending on the value of $X_i$, according to the abovementioned four processing cycles, in the four memory elements 204a, 204b, 204c, 204d of nonlinear feedback shift register 200_2 (FIG. 7) there is present either the preceding state value, or a state value of a nonlinear feedback shift register 200_2 preceding in the shift register ring. With values for $X_i$ changing in each case, after a certain number of processing cycles, there is advantageously present a permutation of the starting states of the finite-state machines that is random and is unknown to a possible attacker.

For example, functional block 230, which forms the $X_i$ bit, may be developed as an AND element, so that, on the assumption of vanishing input signals, that is, input[0]=input[1]=input[2]=input[3]=0, and using control signal shift (FIG. 7) of deactivated internal feedback per shift register 200_2, the following scenarios may arise:

Random Bit Z'=0:

All flip-flops 204a, 204b, 204c, 204d of all shift registers 200_2 of signature device 100 are interconnected in a ring topology, so that the state of a flip-flop 204a of the $n^{th}$ shift register, with reference to the ring topology, corresponds to the state of flip-flop 204d of the $(n-1)^{th}$ shift register, etc. The state value of flip-flop 204d of the last, that is, presently, the sixteenth shift register 200_2 that belongs to transformation element T_15 (FIG. 1), is accordingly shifted during a cycle change into flip-flop 204a of first shift register 200_2, which belongs to transformation element T_0 (FIG. 1).

Random Bit Z'=1 and Bit $G_i$ of the Secret Key=1:

Observed shift register 200_2 is excluded from the ring topology by the activation of its output multiplexer 240 having the value logical one. There takes place a local feedback of the state values within the shift register 200_2, so that after four cycles the output state is produced again. The state bits of a shift register lying upstream are transmitted directly to a shift register lying downstream, while going around shift register excluded from the ring topology.

Random Bit Z'=1 and Bit $G_i$ of the Secret Key=0:

Observed shift register 200_2 is a part of the ring topology. All the flip-flops 204a, 204b, 204c, 204d of that shift register 200_2 for whose secret bit $G_i$, $G_i$=0 applies, are interconnected in the ring topology, and the corresponding state values are displaced further in response to a cycle change within the ring topology. All state bits of a shift register 200_2 are successively replaced by the state bits of a shift register 200_2 lying upstream in the ring topology (in FIG. 10a farther to the left).

In a circuit system according to FIG. 10a, if several different random values Z' are applied for 4 clock pulses in each case, the initial states of shift register 200_2 exchange and shift corresponding to the above statements. Since the exchanges are a function of the secret key G having its secret bits $G_i$, and these exchanges are replaced at random value Z'=0 by shifts, then, in response to a sufficient number of exchanges, an initial state is reached for the signature formation according to the present invention, which, on the one hand, is random (because of the use of random bit sequence Z') and is also not predictable for an attacker, because the latter cannot calculate the current permutation even when knowing random bits Z', since a reached state also depends on secret key G. Compared to the storing of the entire initial state in a secret memory 102 as in FIG. 5a, secret key G typically has a lower bit length, which proves to be an advantage when storing in a secret memory.

The current input of the abovementioned shifting operation is constant, because the number of bits in shift register 200_2 does not change. Multiplexers 220, 240 always drive the same load. Depending on the values at the selected input of a multiplexer, however, the state of its output signal does change. For the sum of all input multiplexers 220 in FIG. 10a, the same state bits appear in each cycle, only at different positions in the ring topology, in each case. For output multiplexer 240, not all theoretically possible bit values are present; the bits of the bypass branch are not guided over this multiplexer 240. It depends on how many bits are $X_i=1$ and also how many ones of these lie directly one after the other (cascading). In this instance, there may be differences in current usage and, above all, in delay, if the cascading becomes too great. It may therefore be meaningful to avoid cascading by a suitable design of secret bits $G_i$. If, for instance, $G_{i-11}=1$, one obtains by force $G_i=0$, for example. This determination can be taken into account already when selecting secret bits $G_i$ or even by a circuit which, independently of the selection of secret bit $G_i$ prevents a succession of two bit values of one.

FIG. 10b shows a circuit system having a transformation element TE_1 according to the present invention, which makes possible a cascading in both directions if a plurality of bits $X_i$ have a value of one, one after another. This is achieved by the additional multiplexers 241, 221. These multiplexers of the $i^{th}$ transformation element TE_1 switch as a function of the $X_i$ values of the predecessor element or successor element TE_0 or TE_1. Multiplexers 221 are activated by $X_{i-1}$ and multiplexers 241 by $X_{i+1}$. This circuit system thereby offers the advantage that bits not otherwise included in the cascading have a corresponding effect on the current usage. These bits are interconnected to form a separate local ring. With that, the bypass operations in the forwards branch are superposed by the backwards branch. The timing in the two branches is equivalent: in the forwards branch by multiplexers 240 and in the backwards branch by multiplexers 241. Similarly, the timing in the partial rings is the same: In the global ring it is via multiplexers 240, 220, in the partial ring via multiplexers 221, 220. The generation of the permutation is thereby observed with great difficulty from the current usage, even in the case of cascading. Furthermore, the circuit system according to FIG. 10b results in a greater intermixture of the initial values for the initialization of the finite-state machines, because a shifting of state data to the left in FIG. 10b is able to take place.

Figure 10C:
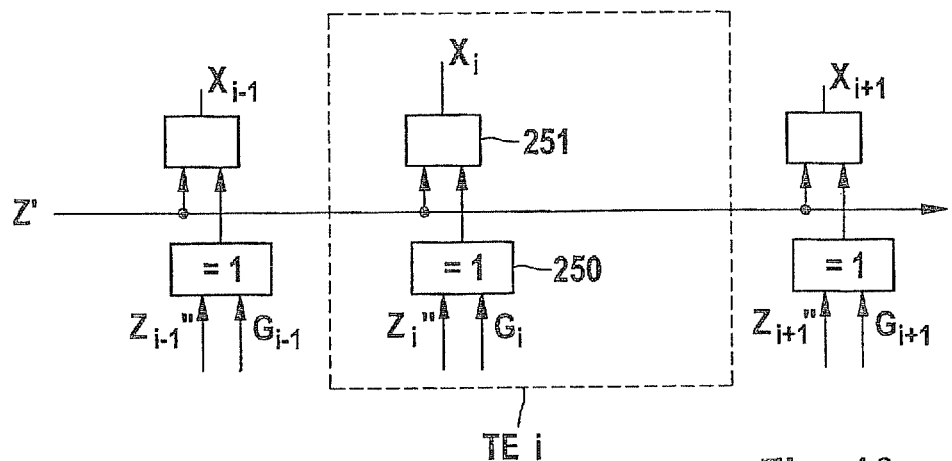
FIGS. 10c, 10d, 10e, and 10f show circuit systems for use with the transformation elements according to FIGS. 10a, 10b and a time lapse of appertaining operating variables.

Now, if in the circuit according to FIG. 10b a circuit as in FIG. 10a is also used for generating the $X_i$ values, which regulate the switching over of the shifting chains, it becomes apparent that potential attacks are possible because the values of the secret bits $G_i$ are constant. FIG. 10c shows a circuit system which advantageously generates variable values $X_i$ from secret bits $G_i$.

For this purpose, additional random values $Z_i''$ go into the generation of control bits $X_i$ together with secret bits $G_i$. As may be seen in FIG. 10c, a control bit $X_i$, which is assigned, for example, to the $i^{th}$ transformation element TE_i of signature device 100 according to the present invention, is formed as a function of additional random value $Z_i''$, of secret bit $G_i$ and of control bit $X_i$, presently additional random value $Z_i''$ and secret bit $G_i$ being supplied to XOR element 250. An output signal of XOR element 250 is supplied, together with random bit Z', to AND element 251, at whose output control bit $X_i$ is obtained accordingly.

In order to let a potential attacker have fewer possibilities of making an attack, one should take care, especially in the case of a known, or even externally specified random value, that this random value is not switched directly to input Z' of the circuit according to FIG. 10a or FIG. 10c.

It is convenient if random value Z generates, for example, via a modified linear feedback shift register, LFSR, a pseudo-random sequence having many signal changes for random for random bit Z'. For this purpose, the random value is supplied, for instance, to an LFSR 260 as in FIG. 10f. LFSR 260 has four flip-flops 261a, 261b, 261c, 261d, which are connected to one another via nonequivalence elements 262a, 262b.

Figure 10D:
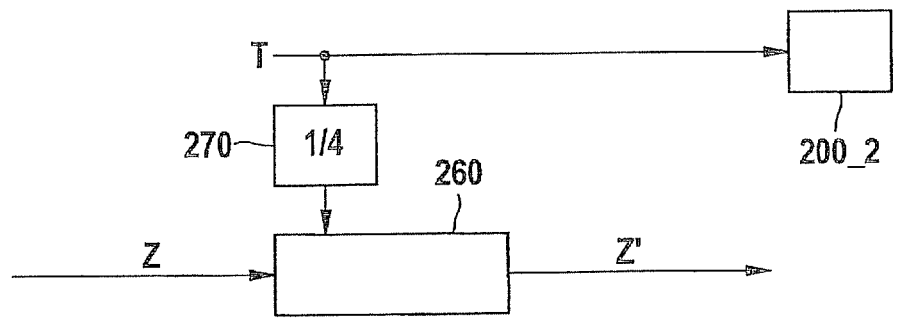
Figure 10E:
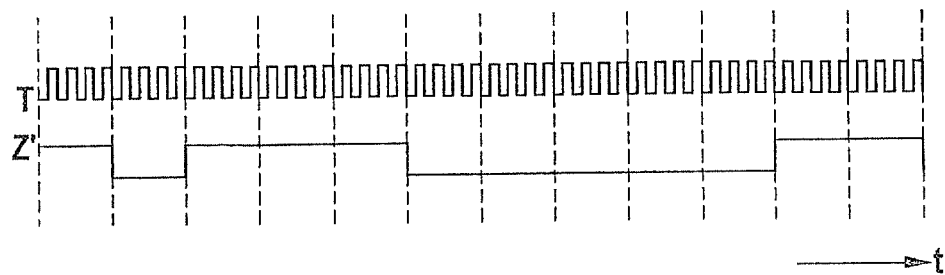
Figure 10F:
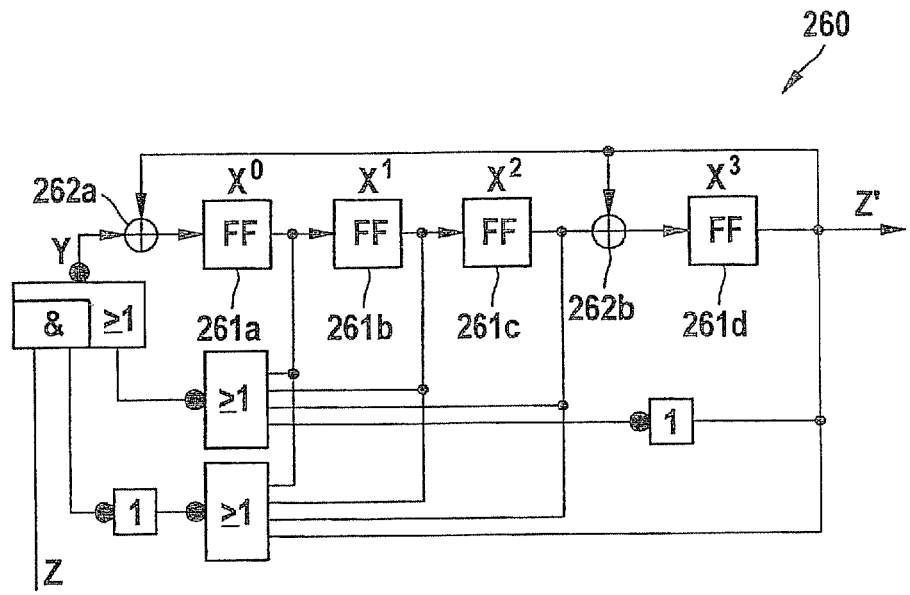

The state values of individual flip-flops 261a, 261b, 261c, 261d are fed back via diverse logic elements (not designated in greater detail), together with random value Z to nonequivalence element 262a, as may be seen in FIG. 10f. At the output of LFSR 260, modified random value Z' is finally obtained as the most significant state bit of LFSR 260. The outputs of the other flip-flops 261a, 261b, 261c may be used as modified random values $Z_i''$ in the circuit according to FIG. 10c. While using random values Z', $Z_i''$, generated by LFSR 260 internally in signature device 100, and in connection with a sufficiently long permutation phase for the initialization of finite-state machines ZA, one may count on a sufficient exchange of the starting values, and consequently a reduced possibility of attack with respect to the signature formation according to the present invention.

FIG. 10d indicates a device, according to the present invention, for producing random bits Z', modified according to the present invention, from usually obtained random bits Z. Random bits Z may be generated either internally in signature device 100 or provided by an external source. Presently, LFSR 260 is clock pulsed at a frequency T/4, which is obtained via a divider 270 from a reference clock pulse T. Reference clock pulse T is supplied directly to shift registers 200_2 (FIG. 10a) according to the present invention, and defines their processing cycles.

FIG. 10e shows a curve over time of reference clock pulse T, for example, and random bits Z' obtained according to the present invention.

The $X_i$ values ascertained by using random values Z', $Z_i''$ obtained according to the present invention, cf. FIG. 10c, advantageously enable a variable design of including or skipping individual shift register 200_2 (FIG. 10a) for the entire ring topology. Thereby one is able to attain a better intermixture of state values among the various shift registers 200_2 and the finite-state machines, but it also makes more difficult the ability of an attacker to observe.

In one further embodiment of the present invention, in the circuit according to FIG. 10c, one is also able to limit a maximum number of starting values skipped during the displacement of state values. For this purpose, control bit values $X_i$ are made dependent on values $X_{i-1}$, $X_{i-2}$ of preceding stages i-1, i-2. From a circuit technology point of view, for instance, value $X_i=1$ can only be admitted if at least one of the following two equations applies: $X_{i-1}=0$ or $X_{i-2}=0$. With that, the cascading is limited to two stages, for example.

The preceding initialization procedure may be applied to all finite-state machines ZA of both groups G_0, G_1 (FIG. 2) of transformation elements. For the finite-state machines and shift registers of second group G_1, additional secret bits ($G_i$ values) may be provided. Alternatively, secret bits $G_i$, or values derived from them, may also be used for the finite-state machines of first group G_0. It is also possible to use inverted secret bits, in order to attain a further compensation among groups G_0, G_1, also with respect to the initialization. The possibility also exists of loading a generated or loaded original starting state of the finite-state machines of first group G_0 into the finite-state machines of second group G_1, and then to manipulate them further, if necessary, for instance, by applying a random input sequence input_md, (cf. FIG. 5b).

The components illustrated in FIGS. 10a, 10b, 10c, in a circuit technology implementation, should be implemented, if possible, as a repetitive pattern in a layout of signature device 100, in order to make an unauthorized analysis of signature device 100 and the electromagnetic radiations of individual components more difficult.

Figure 8:
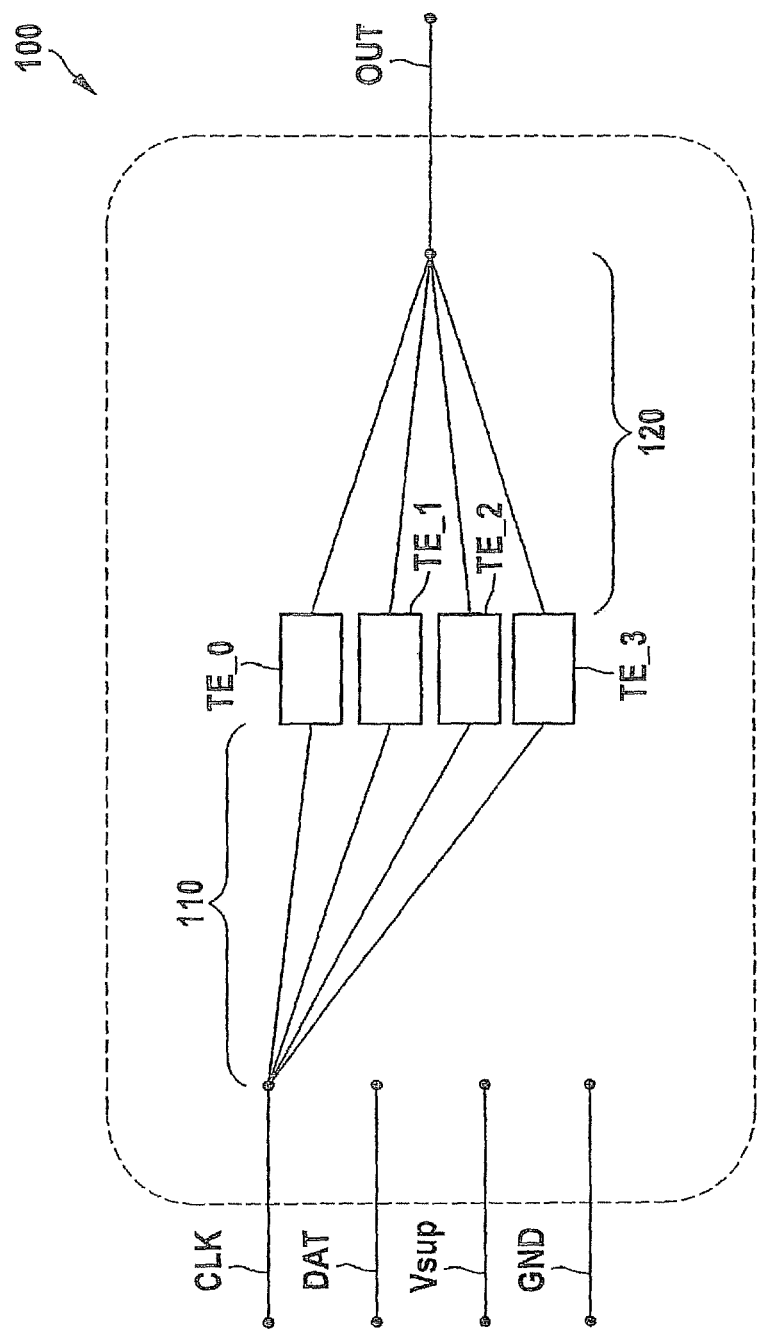
FIG. 8 shows a circuit system for implementing the device according to the present invention.

FIG. 8 shows schematically an implementation of signature device 100, according to the present invention, in the form of a circuit system having a plurality of electronic components. Circuit system 100 has as input terminals a clock pulse input CLK and a data input DAT, via which, for example, input signal input (FIG. 1) may be provided. In addition, circuit system 100 has a supply voltage terminal Vsup and a further reference potential terminal GND, which may be a ground terminal, for example.

For the sake of clarity, FIG. 8 illustrates only such line sections 110 of clock pulse lines CLK which supply the four transformation elements TE_0, . . . , TE_3, illustrated in exemplary fashion, with the clock pulse signal. Also illustrated are those line sections 120 of data lines which connect transformation elements TE_0, . . . , TE_3 to an output terminal OUT of circuit system 100.

According to the present invention, line sections 110, 120 of clock pulse lines CLK and of data lines OUT are adjusted to one another with respect to length, transmission properties, capacity, etc., in such a way that, from a common terminal CLK and to a common terminal OUT, signals transmitted via line sections 110, 120 arrive simultaneously at the respective components TE_0, TE_1, . . . . Because of the symmetry coming about from this and the synchronicity with respect to signal processing of transformation elements TE_0, . . . , TE_3, DPA attacks are made even more difficult.

Figure 11A:
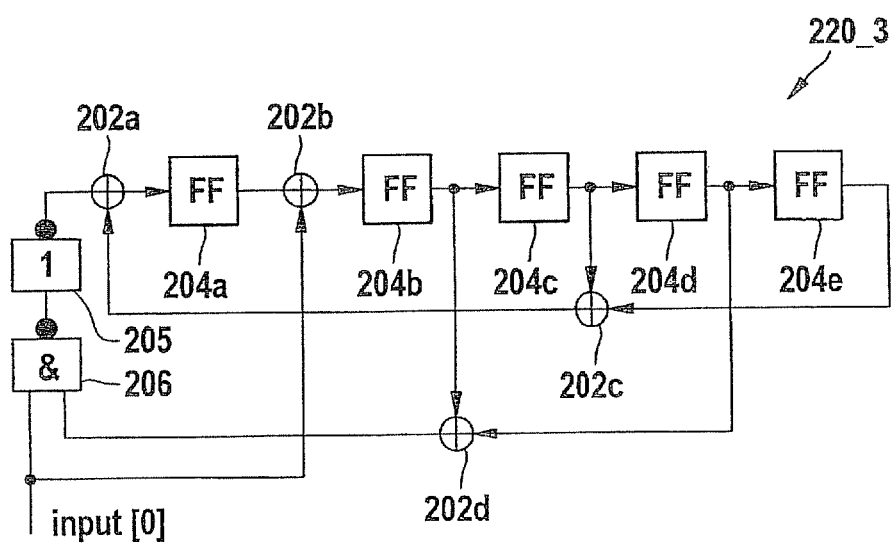
FIG. 11a show an implementation of a finite-state machine having a state memory of five bits in the form of a nonlinear feedback shift register.

FIG. 11a shows a further specific embodiment of a nonlinear feedback shift register 220_3 according to the present invention, which has altogether 5 memory elements 204a, 204b, 204c, 204d, 204e, which are linked to one another via nonequivalence elements 202a, 202b, 202c, 202d, as may be seen in FIG. 11a. A nonlinear feedback is implemented in the topology, illustrated in FIG. 11a, by the feedback branches including functional blocks 205, 206. Input signal input[0] is additionally supplied to functional block 206.

Figure 11B:
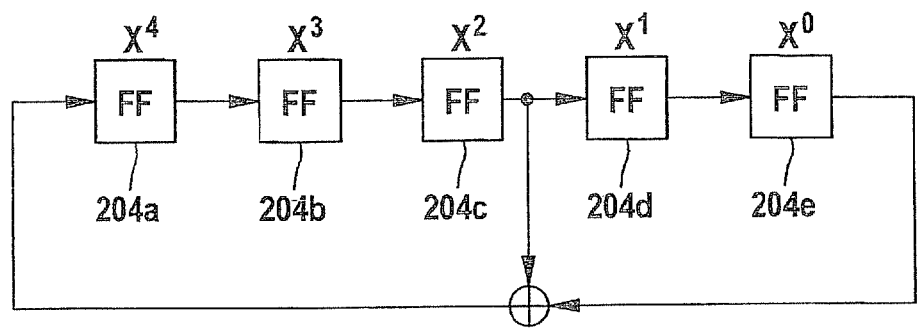
Figure 11C:
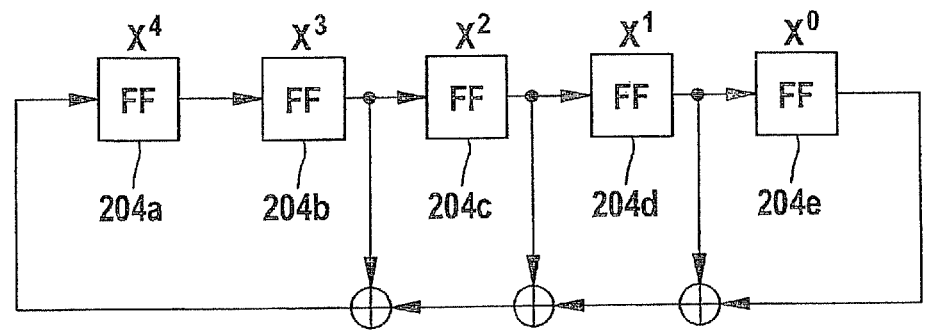

The topology of nonlinear feedback shift register 220_3, described above with reference to FIG. 11a, as a function of input signal[0], implements the two different primitive polynomials $x^5+x^2+1$ und $x^5+x^3+x^2+x+1$, compare FIGS. 11b, 11c, which show a base structure of shift register 220_3 of FIG. 11a coming about in each case as a function of input signal input[0].

Figure 12:
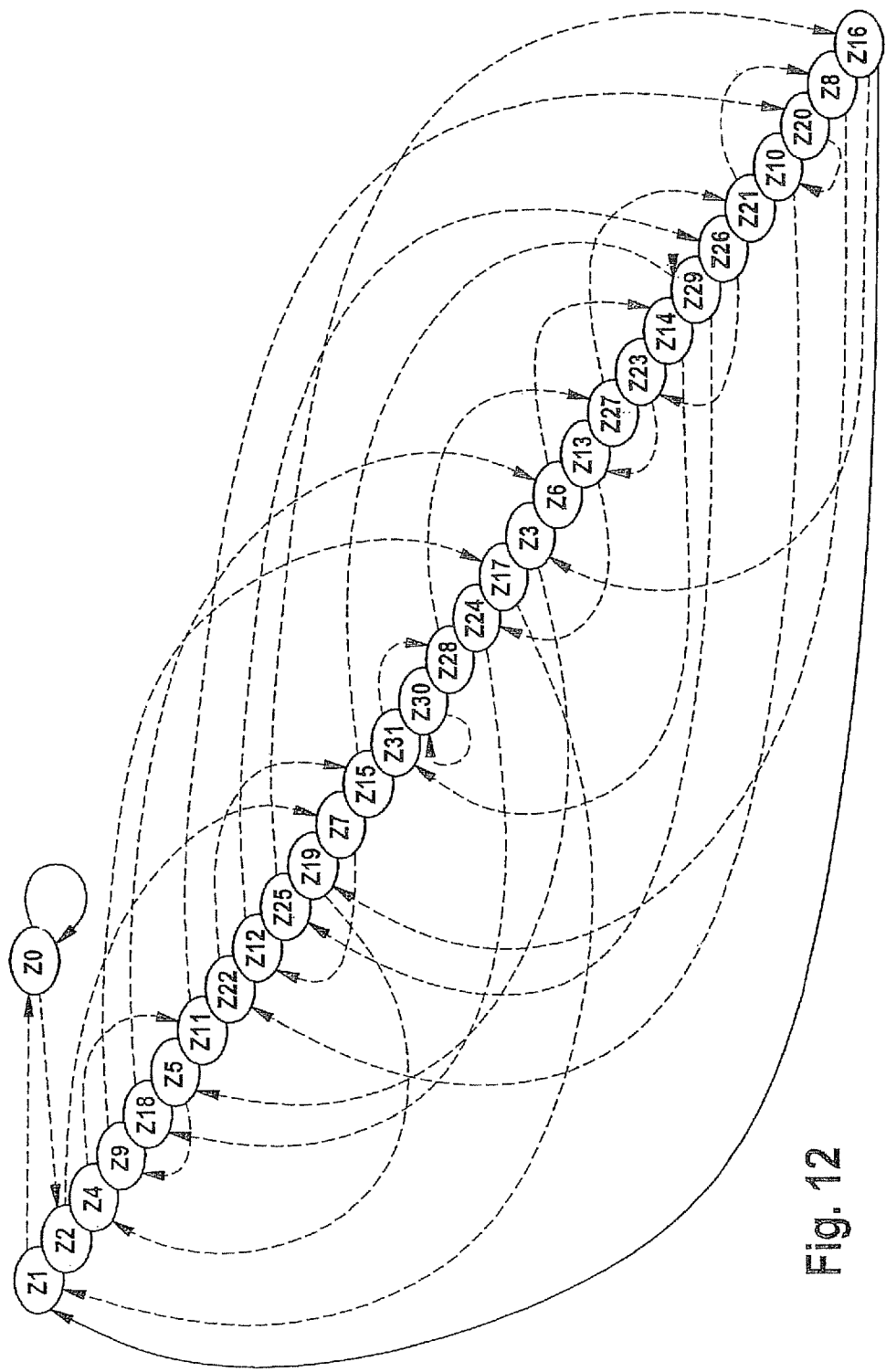

FIG. 12 shows a graphic representation of state transition, which shows all possible states Z0, . . . , Z31 of the finite-state machine implemented by the nonlinear feedback shift register 220_3 according to FIG. 11a. The connections already explained with reference to the graphic representation of state transitions according to FIG. 9 apply for the state transitions.

Figure 13:
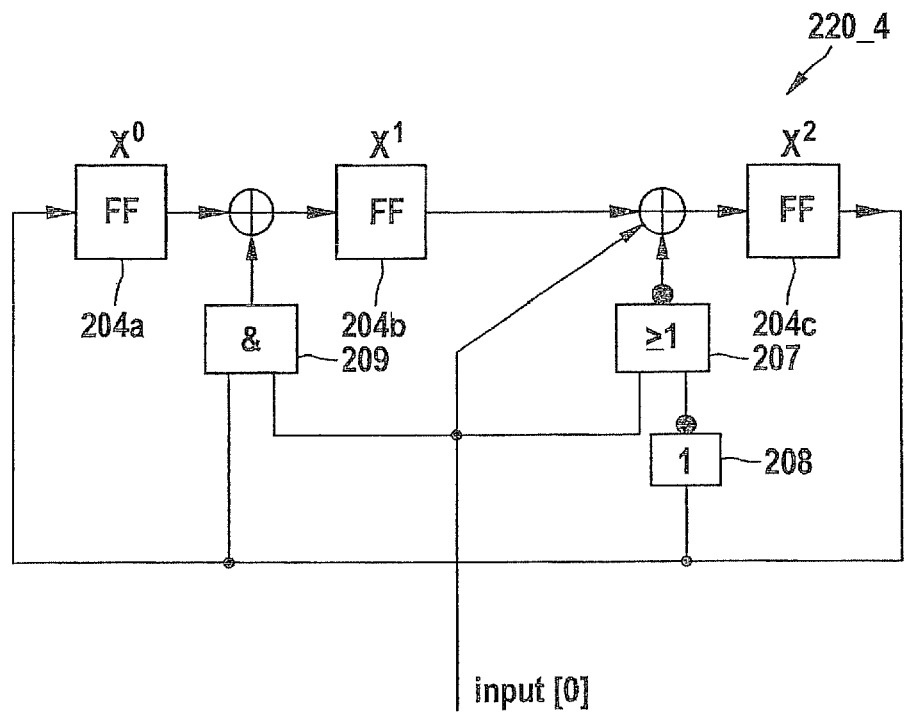
FIG. 13 show an implementation of a finite-state machine according to the present invention having a state memory of three bits in the form of a nonlinear feedback shift register.

FIG. 13 shows in exemplary fashion a nonlinear feedback shift register 220_4 having three memory elements 204a, 204b, 204c, which are linked to one another via nonequivalence elements that are not designated more closely. A nonlinear feedback is effected by additional functional blocks 207, 208, 209 as a function of input signal input[0].

Illustrated nonlinear feedback shift register 220_4 implements the primitive polynomials $x^3+x+1$ und $x^3+x^2+1$, again as a function of a state of input signal input[0].

Figure 14:
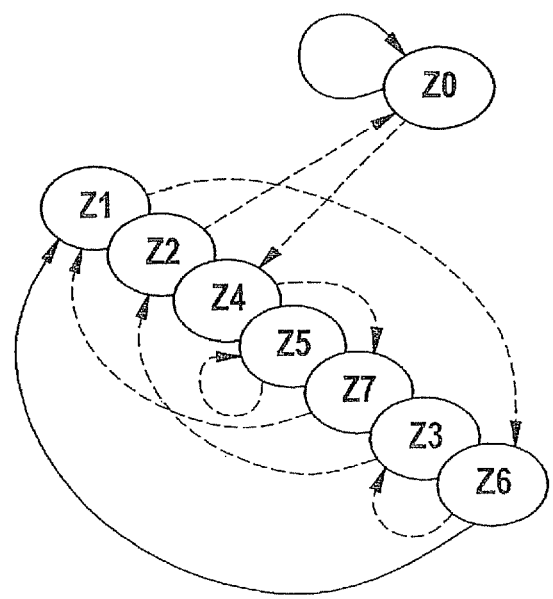
FIG. 14 show a state transition graphic presentation of the nonlinear feedback shift register according to FIG. 13.

FIG. 14 shows a graphic representation of a state transition of the possible states of the nonlinear feedback shift register 220_4 of FIG. 13.

Since a shift register of the NLMISR type has collisions, that is, the property that, starting from a certain initial state, different input data sequences may exist which both open out into the same end state, it may advantageously be provided, according to the present invention, that one should develop finite-state machines ZA, ZA', according to the present invention, that work according to the NLMISR principle, in such a way that they work collision-free. For this it has to be assured that input signal input (FIG. 1) does not remain constant for a specifiable maximum number of processing cycles, one after another. This may advantageously be achieved, for example, by adding at least one a parity bit to input signal input, the parity bit, the same as the input signal itself, being supplied to the transformation elements TE_0, . . . for processing. By adding the parity bit at a suitable place in the input signal, it is advantageously ensured that the input signal does not remain constant longer than the maximum number of processing cycles.

Alternatively or in addition, input signal input may also be supplemented by padding bits, which have the same effect.

Suitable devices for the modification of input signal input according to the criteria named above, may be provided in the individual transformation elements TE_0, . . . according to the present invention.

What is claimed is:

1. A device for forming a signature from at least one of an input signal and a signal that is a function of the input signal, comprising:
   a plurality of transformation elements, each having a finite-state machine, to which, on an input end, in each case at least one of an input signal and a signal that is a function of the input signal, is able to be fed; and
   a plurality of groups of transformation elements, and wherein in each case the at least one of the same input signal and the same signal that is a function of the input signal being feedable to all transformation elements of the same group;
   wherein all of the finite-state machines are similar, in particular initializable, and configured so that each finite-state machine always respectively has a different state from all of the other finite-state machines, and
   wherein the signature is formable as a function of the state data of at least one finite-state machine, so as to render at least more difficult side channel attacks based on statistical analysis, which analysis occurs from outside the device.

2. The device of claim 1, wherein the number of transformation elements corresponds to the number of maximum possible different states of the finite-state machine.

3. The device of claim 1, wherein the input signal is able to be fed to the transformation elements in parallel in the form of data words of specifiable length.

4. The device of claim 1, wherein the signature is able to be formed as a concatenation of data words representing the state data of the finite-state machines of a plurality of transformation elements.

5. The device of claim 1, wherein the finite-state machines are configured so that a transition from an initial state to a sequential state occurs as a function of the input signal so that for any desired specifiable input signal a unique sequential state is assumed in each case, in which no two different output states are in existence which, in response to the same input signal lead to the same sequential state.

6. The device of claim 1, wherein the input signal is able to be fed to the transformation elements of a first group and an inverted input signal is able to be fed to the transformation elements of a second group.

7. The device of claim 1, wherein the finite-state machines of transformation elements, which belong to different groups, are not similar to one another.

8. The device of claim 1, wherein at least one of the finite-state machines is able to be initialized using a specifiable starting state.

9. The device of claim 8, wherein the starting state is able to be stored in a secret memory and is able to be transmitted into the finite-state machine for the initialization.

10. The device of claim 9, wherein after the initialization using the starting state, the finite-state machines are able to be acted upon using a random-based input signal.

11. The device of claim 8, wherein all the finite-state machines are able to be initialized using a specifiable starting state respectively, each finite-state machine being able to be initialized using a different individual starting state.

12. The device of claim 11, wherein the individual starting states of the finite-state machines are permutable among one another, particularly as a function of chance and/or as a function of a secret key.

13. The device of claim 1, wherein the device is implemented at least partially in the form of a circuit system having at least one of monolithically integrated electronic and monolithically integrated optical components.

14. The device of claim 13, wherein one of the following is satisfied: (i) at least one of groups of components and the data lines contacting them implement the transformation elements, and (ii) their finite-state machines similarly configured, in the form of repetitive patterns in a layout corresponding to the circuit system.

15. The device of claim 13, wherein line sections of at least one of clock pulse lines, data lines, and current supply lines, which are connected to the groups of components implementing the plurality of transformation elements or their finite-state machines, are adjusted to one another so that signals transmitted over the line sections from a common terminal arrive simultaneously at the respective groups.

16. The device of claim 1, wherein at least one finite-state machine is configured using a nonlinear feedback shift register (NLMISR) having a plurality of inputs.

17. The device of claim 16, wherein the NLMISR has a plurality of memory elements connected in series, configured as flip-flops, and a switchover unit, which is configured to modify at least one feedback branch of the NLMISR as a function of the input signal so that, because of the NLMISR, a polynomial assigned to the state of the input signal is able to be implemented.

18. The device of claim 16, wherein the NLMISR is configured to process a 4-bit long input signal and to implement the primitive polynomials $x^4+x^3+1$ and $x^4+x+1$.

19. The device of claim 16, wherein the NLMISR is configured to process a 3-bit long input signal and to implement the primitive polynomials $x^3+x+1$ and $x^3+x^2+1$.

20. A method for forming a signature from an input signal and a signal that is a function of the input signal, the method comprising:
respectively feeding, at the input end, the at least one of the input signal and the signal that is a function of the input signal, to a plurality of transformation elements each having one finite-state machine;
wherein all of the finite-state machines are similar and are configured to be initialized so that each of the finite-state machines always respectively has a different state from all of the other finite-state machines,
wherein the signature is formed as a function of the state data of at least one finite-state machine, and
wherein a plurality of groups of transformation elements is provided, and wherein in each case the at least one of the same input signal and the same signal that is a function of the input signal is feedable to all the transformation elements of the same group machine, so as to render at least more difficult side channel attacks based on statistical analysis, which analysis occurs from outside the device.

21. The method of claim 20, wherein as many transformation elements are used as there exist maximally possible different states of the finite-state machine.

22. The method of claim 20, wherein at least one of the following is satisfied: (i) the input signal is fed to the transformation elements in parallel in the form of data words of specifiable length, and (ii) the signature is formed as the concatenation of data words representing the state data of the finite-state machines of a plurality of transformation elements.

23. The method of claim 20, wherein each of the finite-state machines transits from an initial state to a sequential state as a function of the input signal so that for any desired specifiable input signal a unique sequential state is assumed in each case, in which no two different output states are in existence which, in response to the same input signal lead to the same sequential state.

24. The method of claim 20, wherein the input signal is fed to the transformation elements of a first group and an inverted input signal is fed to the transformation elements of a second group.

25. The method of claim 20, wherein at least one finite-state machine is initialized using a specifiable starting state, each finite-state machine within a group being initialized using a different individual starting state.

26. The method of claim 25, wherein the starting state is stored in a secret memory and is transmitted into the finite-state machine for the initialization.

27. The method of claim 26, wherein after the initialization using the starting state, the finite-state machines are acted upon by a random-based input signal.

28. The method of claim 25, wherein the individual starting states of the finite-state machines are permuted among one another, as a function of chance and/or as a function of a secret key.

* * * * *